US010630834B2

(12) United States Patent
Rao et al.

(10) Patent No.: US 10,630,834 B2
(45) Date of Patent: Apr. 21, 2020

(54) INTERCEPTION FOR ENCRYPTED, TRANSCODED MEDIA

(71) Applicant: NOKIA SOLUTIONS AND NETWORKS OY, Espoo (FI)

(72) Inventors: Nagaraja Rao, Boca Raton, FL (US); Derek Underwood, Amherst, NH (US); Wolfgang Buecker, Neubiberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 78 days.

(21) Appl. No.: 15/548,831

(22) PCT Filed: Feb. 4, 2015

(86) PCT No.: PCT/US2015/014448
§ 371 (c)(1),
(2) Date: Aug. 4, 2017

(87) PCT Pub. No.: WO2016/126246
PCT Pub. Date: Aug. 11, 2016

(65) Prior Publication Data
US 2018/0013880 A1  Jan. 11, 2018

(51) Int. Cl.
*H04L 29/06* (2006.01)
*H04M 3/22* (2006.01)
(Continued)

(52) U.S. Cl.
CPC ...... *H04M 3/2281* (2013.01); *H04L 63/0281* (2013.01); *H04L 63/061* (2013.01);
(Continued)

(58) Field of Classification Search
CPC ............. H04M 3/2281; H04M 1/2535; H04M 7/0072; H04L 63/0281; H04L 63/061; H04L 63/166; H04L 63/306; H04L 65/00
See application file for complete search history.

(56) References Cited

U.S. PATENT DOCUMENTS 6,603,774 B1 * 8/2003 Knappe ................. G10L 19/167
370/352
6,721,272 B1 * 4/2004 Parnafes ............... H04L 47/724
370/235
(Continued)

FOREIGN PATENT DOCUMENTS

CN  102487520 A  6/2012
EP  1307036 A1  5/2003
(Continued)

OTHER PUBLICATIONS

3GPP TS 33.107 V12.9.0 (Dec. 2014); 3rd Generation Partnership Project; Technical Specification Group Services and System Aspects; 3G security; Lawful interception architecture and functions (Release 12).

(Continued)

*Primary Examiner* — Sarah Su
(74) *Attorney, Agent, or Firm* — Squire Patton Boggs (US) LLP

(57) ABSTRACT

Certain embodiments of the invention generally relate to lawful interception of communications for IP Multimedia System-based (IMS-based) voice over IP (VoIP). For example, some embodiments relate to interception of communications including interception for encrypted, transcoded media. A method may include identifying a network node that provides call content interception. The method may also include determining a codec type used at a location of the call content interception at the network node. The method may further include sending a matched codec of the codec type used at the location of the call content interception at the network node to a delivery function in the communications network.

6 Claims, 23 Drawing Sheets

(51) Int. Cl.
*H04M 1/253* (2006.01)
*H04M 7/00* (2006.01)

(52) U.S. Cl.
CPC .......... *H04L 63/166* (2013.01); *H04L 63/306* (2013.01); *H04L 65/00* (2013.01); *H04M 1/2535* (2013.01); *H04M 7/0072* (2013.01)

(56) References Cited

U.S. PATENT DOCUMENTS

| | | | | |
|---|---|---|---|---|
| 8,170,123 | B1* | 5/2012 | Hobgood | H04N 21/41407 375/240.26 |
| 2002/0176404 | A1* | 11/2002 | Girard | H04M 3/42153 370/352 |
| 2004/0199765 | A1* | 10/2004 | Kohane | G06F 21/6245 713/165 |
| 2004/0202295 | A1* | 10/2004 | Shen | H04M 3/2281 379/112.01 |
| 2005/0094651 | A1* | 5/2005 | Lutz | H04M 3/2281 370/401 |
| 2006/0212933 | A1 | 9/2006 | Scoggins et al. | |
| 2006/0264200 | A1 | 11/2006 | Laiho et al. | |
| 2007/0201484 | A1* | 8/2007 | Kenrick | H04L 29/06027 370/395.5 |
| 2007/0297418 | A1* | 12/2007 | Lee | H04L 63/00 370/395.52 |
| 2009/0047936 | A1* | 2/2009 | Kampmann | H04L 65/1069 455/414.1 |
| 2009/0106369 | A1* | 4/2009 | Chen | G06Q 10/107 709/206 |
| 2010/0284372 | A1* | 11/2010 | Marinescu | H04W 36/02 370/332 |
| 2012/0295600 | A1* | 11/2012 | De Simone | H04L 63/30 455/414.1 |
| 2013/0117555 | A1* | 5/2013 | Yang | H04L 63/0428 713/151 |
| 2014/0351573 | A1* | 11/2014 | Martini | H04L 63/0428 713/153 |

FOREIGN PATENT DOCUMENTS

| | | | |
|---|---|---|---|
| EP | 1667414 A2 * | 6/2006 | .......... H04M 3/2281 |
| EP | 2634980 A1 | 9/2013 | |
| WO | WO 2009/021562 A1 | 2/2009 | |
| WO | 2010099823 A1 | 9/2010 | |
| WO | WO 2013/117243 A1 | 8/2013 | |
| WO | WO 2015/075408 A1 | 5/2015 | |

OTHER PUBLICATIONS

3GPP TS 33.108 V12.7.0 (Dec. 2014); 3rd Generation Partnership Project; Technical Specification Group Services and System Aspects; 3G security; Handover interface for Lawful Interception (LI) (Release 12).
RfC 3711, M. Baugher et al, The Secure Real-time Transport Protocol (SRTP), Network Working Group, Mar. 2004.
RfC 3830, J. Arkko et al, MIKEY: Multimedia Internet KEYing, Network Working Group, Aug. 2004.
RfC 4568, F. Andreasen et al, Seassion Description Protocol (SDP) Security Descriptions for Media Streams, Network Working Group, Jul. 2006.
RfC 5764, D. McGrew et al, Datagram Transport Layer Security (DTLS) Extension to Establish Keys for the Secure Real-time Transport Protocol (SRTP), IETF, May 2010.
RfC 6043, J. Mattsson et al, MIKEY-Ticket: Ticket-Based Modes of Key Distribution in Multimedia Internet KEYing (MIKEY), IETF, Mar. 2011.
International Search Report & Written Opinion dated Dec. 4, 2015 corresponding to International Patent Application No. PCT/US2015/014448.
European Search Report application No. 15881352.7 dated Jul. 23, 2018.
Korean Office Action issued in corresponding Korean Patent Application No. 10-2017-7024879 dated May 14, 2019.
First Office Action dated Oct. 9, 2019 corresponding to Chinese Patent Application No. 201580078526.4, and partial English translation thereof.

* cited by examiner

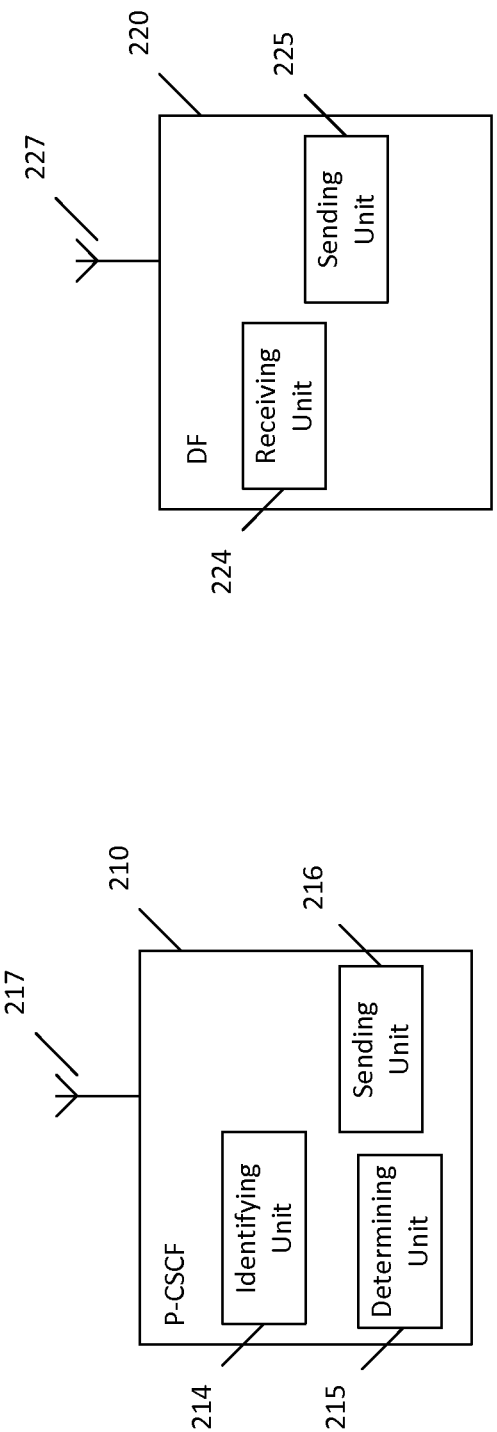

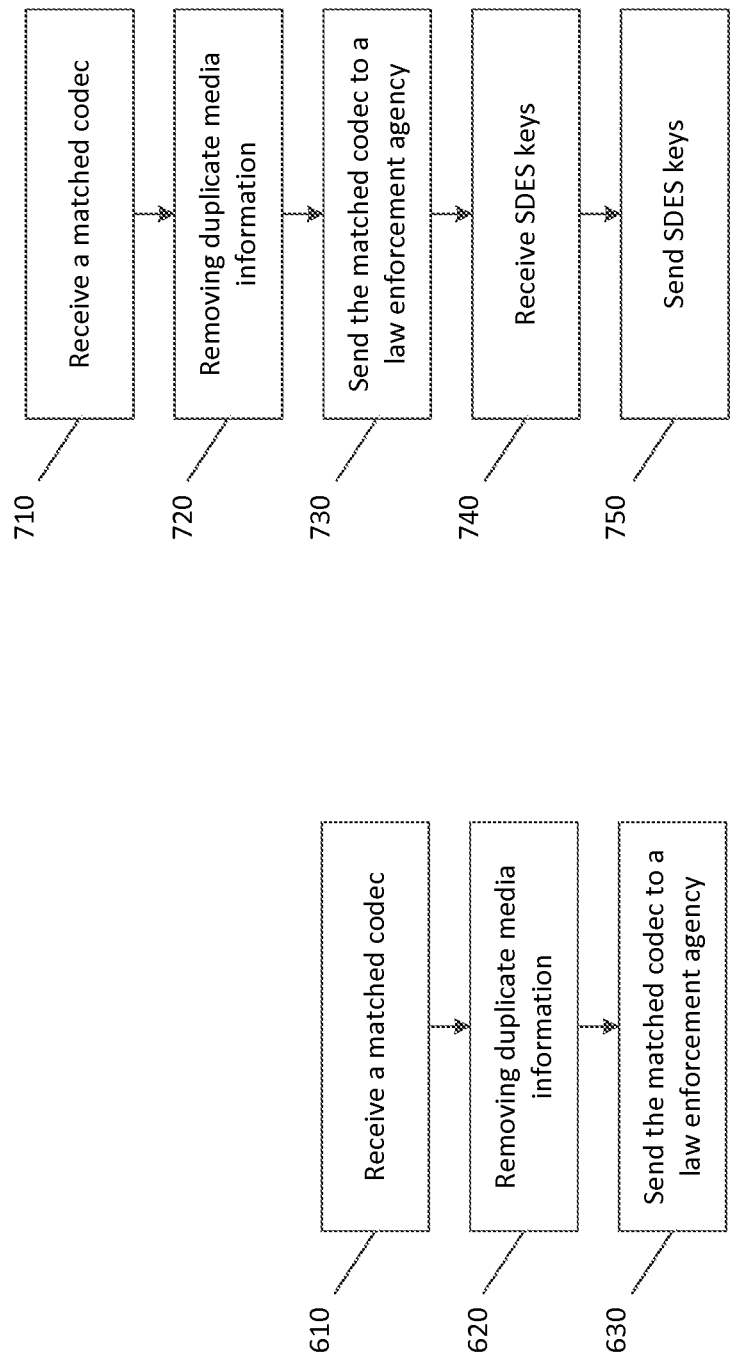

INTERCEPTION FOR ENCRYPTED, TRANSCODED MEDIA

BACKGROUND

Field

Embodiments of the invention generally relate to mobile communications networks, such as, but not limited to, the Universal Mobile Telecommunications System (UMTS), Terrestrial Radio Access Network (UTRAN), Long Term Evolution (LTE) Evolved UTRAN (E-UTRAN). Other embodiments generally relate to lawful interception of communications for IP Multimedia System-based (IMS-based) voice over IP (VoIP). For example, some embodiments relate to interception of communications including interception for encrypted, transcoded media.

Description of the Related Art

Lawful interception (LI) may generally refer to a legally authorized process of intercepting communications, including communications of private individuals. The 3rd Generation Partnership Project (3GPP) TS 33.107 and TS 33.108 define LI, internal and external LI interface for 3GPP network architectures and 3GPP defined services.

SUMMARY

One embodiment is directed to a method, which may include identifying a network node that provides call content interception. In an embodiment, the method may also include determining a codec type used at a location of the call content interception at the network node. In another embodiment, the method may further include sending a matched codec of the codec type used at the location of the call content interception at the network node to a delivery function in the communications network.

In an embodiment, the network node may include a packet data network gateway or an IP multimedia system access gateway. In an embodiment, the method may also include determining the location of call content interception at the network node.

In an embodiment, the location of call content interception at the IP multimedia system access gateway may include an ingress and an egress side.

In an embodiment, the method may further include sending session description protocol security description keys to the delivery function if the call content interception is done at the packet data network gateway or at the ingress side of the IP multimedia system access gateway, and sending no session description protocol security description keys if the call content interception is done at the egress side of the IP multimedia system access gateway.

In an embodiment, the method may further include sending session description protocol security description keys to the delivery function if the call content interception is done at the packet data network gateway, the ingress side of the IP multimedia system access gateway, or the egress side of the IP multimedia system access gateway.

In an embodiment, if the call content is intercepted in a decrypted form, the session description protocol security description keys are not sent to the delivery function.

Another embodiment is directed to an apparatus, which includes at least one processor, and at least one memory including computer program code. In an embodiment, the at least one memory and the computer program code may be configured, with the at least one processor, to cause the apparatus at least to identify a network node that provides call content interception. In an embodiment, the at least one memory and the computer program code may also be configured, with the at least one processor, to cause the apparatus at least to determine a codec type used at a location of the call content interception at the network node. In an embodiment, the at least one memory and the computer program code may further be configured, with the at least one processor, to cause the apparatus at least to send a matched codec of the codec type used at the location of the call content interception at the network node to a delivery function in the communications network.

Another embodiment is directed to an apparatus, which includes identifying means for identifying a network node that provides call content interception. In an embodiment, the apparatus may also include determining means for determining a codec type used at a location of the call content interception at the network node. In an embodiment, the apparatus may further include sending means for sending a matched codec of the codec type used at the location of the call content interception at the network node to a delivery function in the communications network.

In an embodiment, the network node may include a packet data network gateway or an IP multimedia system access gateway. In an embodiment, the apparatus may also include determining means for determining the location of call content interception at the network node.

In an embodiment, the location of call content interception at the IP multimedia system access gateway comprises an ingress side and an egress side. In an embodiment, the apparatus may further include sending means for sending session description protocol security description keys to the delivery function if the call content interception is done at the packet data network gateway or at the ingress side of the IP multimedia system access gateway, and sending no session description protocol security description keys if the call content interception is done at the egress side of the IP multimedia system access gateway.

In an embodiment, the apparatus may also include sending means for sending session description protocol security description keys to the delivery function if the call content interception is done at the packet data network gateway, the ingress side of the IP multimedia system access gateway, or the egress side of the IP multimedia system access gateway.

In an embodiment, if the call content is intercepted in a decrypted form, the session description protocol security description keys are not sent to the delivery function.

Another embodiment may be directed to a computer program, embodied on a non-transitory computer readable medium, the computer program configured to control a processor to perform the method described above.

Another embodiment is directed to a method that may include receiving a matched codec of a codec type used at a location of a call content interception at a media node from a network node in a communications network. In an embodiment, the method may also include sending the matched codec to a law enforcement agency.

In an embodiment, the method may further include receiving session description protocol security description keys from the network node. In an embodiment, the method may also include removing media information received from a serving call state control function that are duplicates of media information received from the network node before sending the media information to the law enforcement agency.

In an embodiment, the method may further include sending the session description protocol security description keys to a second delivery function. In an embodiment, the network node may include a proxy call state control function, an interworking border control function, or a media gateway control function.

Another embodiment is directed to an apparatus, which may include at least one processor, and at least one memory including computer program code. In an embodiment, the at least one memory and the computer program code may be configured, with the at least one processor, to cause the apparatus at least to receive a matched codec of a codec type used at a location of a call content interception at a media node from a network node in a communications network. In an embodiment, the at least one memory and the computer program code may also be configured, with the at least one processor, to cause the apparatus at least to send the matched codec to a law enforcement agency.

Another embodiment is directed to an apparatus, which may include receiving means for receiving a matched codec of a codec type used at a location of a call content interception at a media node from a network node in a communications network. In an embodiment, the apparatus may also include sending means for sending the matched codec to a law enforcement agency.

In an embodiment, the apparatus may further include receiving means for receiving session description protocol security description keys from the network node. In an embodiment, the apparatus may also include removing means for removing media information received from a serving call state control function that are duplicates of media information received from the network node before sending the media information to the law enforcement agency.

In an embodiment, the apparatus may further include sending means for sending the session description protocol security description keys to a second delivery function. In an embodiment, the network node may include a proxy call state control function, an interworking border control function, or a media gateway control function.

Another embodiment is directed to a computer program, embodied on a non-transitory computer readable medium, the computer program configured to control a processor to perform the method described above.

BRIEF DESCRIPTION OF THE DRAWINGS

For proper understanding of the invention, reference should be made to the accompanying drawings, wherein:

FIG. 20 illustrates an apparatus, according to certain embodiments.

FIG. 21 illustrates another apparatus, according to certain embodiments.

FIG. 25 illustrates another method, according to certain embodiments.

FIG. 26 illustrates another method, according to certain embodiments.

DETAILED DESCRIPTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
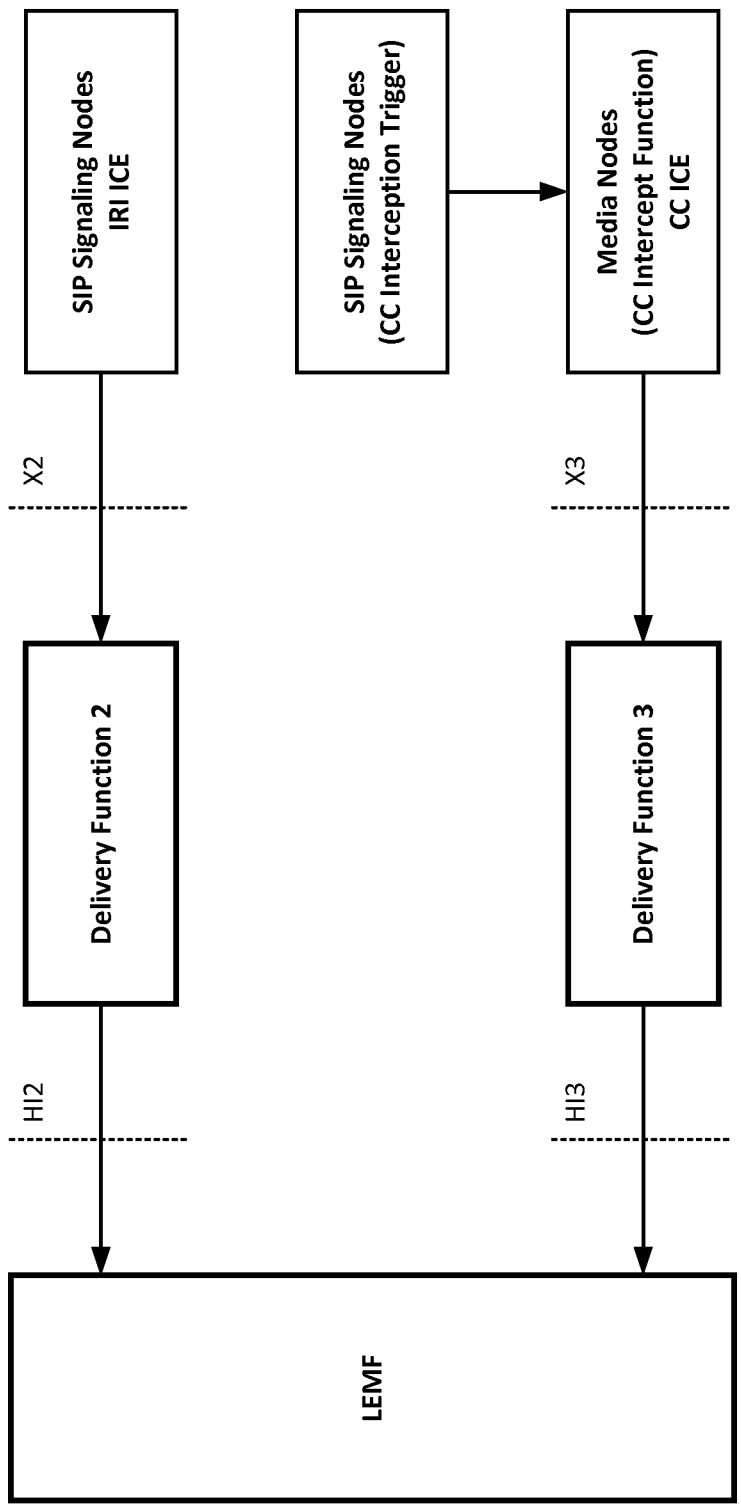
FIG. 1 illustrates an example system for IMS VoIP interception.

FIG. 1 illustrates an overall concept of IMS VoIP LI at an abstract level, as described in 3GPP TS 33.107. Intercept related information (IRI) intercepting control element (ICE) noted in FIG. 1 is the IRI intercept controlling function. The communication content (CC) ICE is the media node that provides the interception.

As per the current standards, the IRI may be intercepted at a serving call state control function (S-CSCF) and optionally at a proxy call state control function (P-CSCF) in a non-roaming scenario. In a roaming scenario, the IRI may be intercepted at the P-CSCF when a visited communication service provider (CSP) has an intercept order.

The CC may be intercepted at particular media nodes depending on the call scenario and also sometimes depending on the deployment scenario. The CC can be intercepted at a packet data network gateway (PDN-GW), gateway generic packet radio service support node (GGSN) or IP multimedia system access gateway (IMS-AGW) for basic calls and intra-CSP forwarded calls. The CC can also be intercepted at an IP multimedia system media gateway (IM-MGW) for inter-CSP forwarded calls (to a user in a CS domain), and at a transit gateway (TrGW) for inter-CSP forwarded calls (to a user in an IMS domain) and in the visited CSP for inbound roaming targets.

The trigger for CC interception may be generated in one of the IMS session initiation protocol (SIP) signalling nodes depending on the media node that performs the CC interception. For example, for CC interception performed at the PDN-GW, GGSN and IMS-AGW, the P-CSCF may send the trigger. For CC interception performed at the IM-MGW, the media gateway control function (MGCF) may send the trigger. Further, for the CC interception performed at the TrGW, the interworking border control function (IBCF) may send the trigger.

The media, including call content, exchanged between the participants of an IMS session may be encrypted either end to end (e2e) or end to access edge (e2ae). In the event the two ends of the call are not using the same codec, the network may perform a transcoding in one of the media nodes. For encrypted media, the 3GPP standards define two options of CC delivery to the law enforcement agency (LEA): (1) deliver the CC in an encrypted form with the encryption keys delivered over the IRI; and (2) deliver the CC in a decrypted form with the delivery function 3 (DF3) performing the media decryption.

When the media is encrypted e2e and when the CSP does not know about the encryption keys, the CSP has no choice but deliver the CC in an encrypted form. When the CSP is aware of the encryption keys, the LEAs have indicated that their preference is to receive the CC in a decrypted form. In option 2 indicated above, the delivery function 2 (DF2) may deliver the encryption keys to the DF3 so as to allow the DF3 to perform the decryption.

The LI standards have limited mention of the e2ae encryption scenario, but have no mention of LI implications due to transcoding. Certain embodiments presented herein describe a method of CC interception for Web Real Time Communication (WebRTC) where e2ae encryption is used for the media.

As per the current standards, when the IRI interception is done at the S-CSCF, the session description protocol (SDP) information reported by the S-CSCF may carry the codec information used for the media and the secured real time protocol (SRTP) master key in the a=crypto attribute, in the event the media is encrypted end to end with Secure RTP (SRTP, RFC 3711) using SDP Security Description (SDES, RFC 4568) for key management. However, in a case where the transcoding is done at the IMS-AGW, the codec information reported in the SDP (from the S-CSCF) may not match the codec used by the intercepted media.

Figure 2:
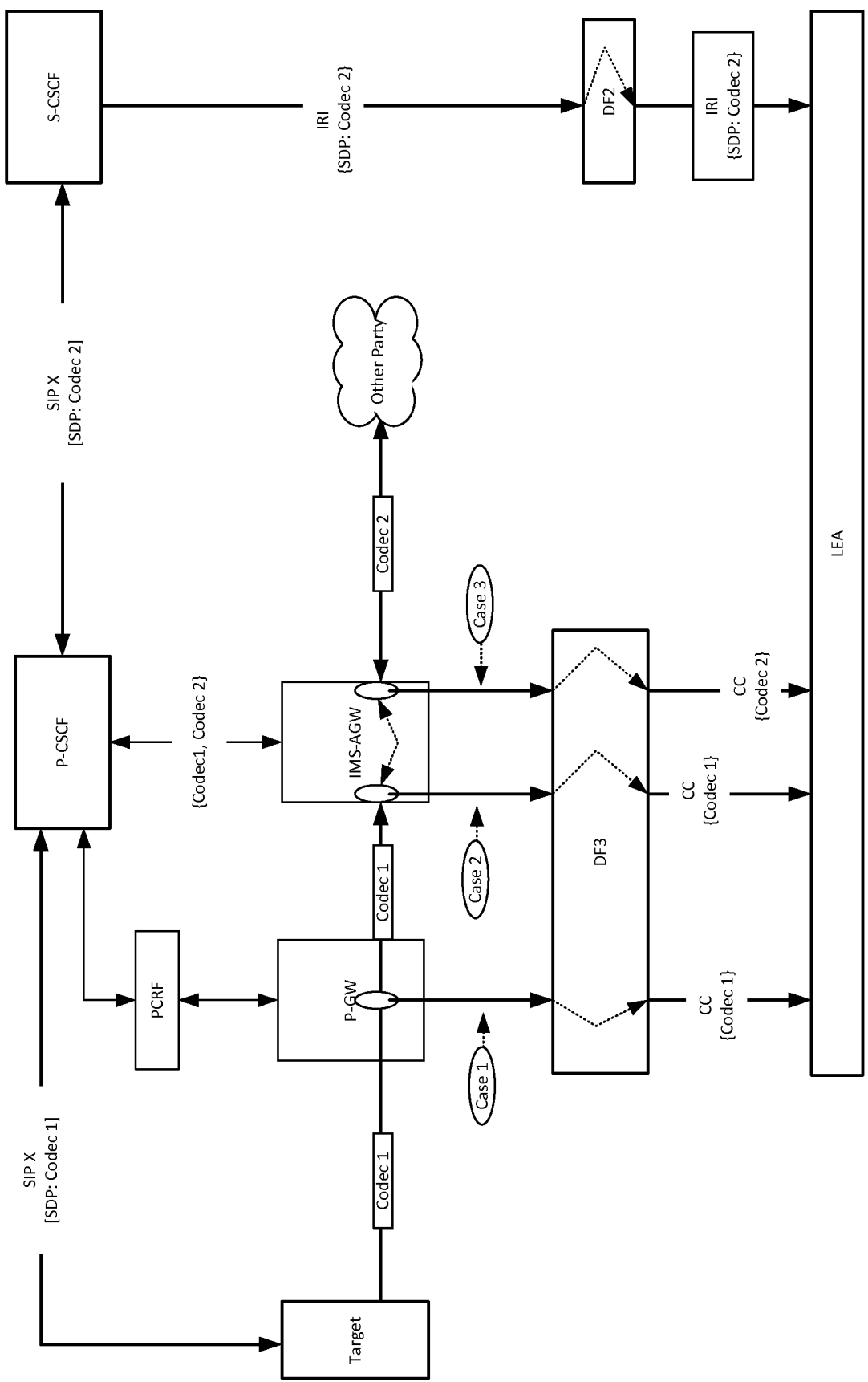
FIG. 2 illustrates three examples of CC interception with media transcoding.

FIG. 2 illustrates three examples of CC interception with media transcoding. In this example, the media is transcoded at the IMS-AGW. Codec 1 is used between the Target and the IMS-AGW, and Codec 2 is used between the IMS-AGW and the other party of communication. Further, three possible interception points for CC are shown in FIG. 2. In case 1, the CC interception is done at the P-GW (also referred to as PDN-GW). In case 2, the CC interception is done at IMS-AGW before the transcoding. In case 3, the CC interception is done at the IMS-AGW after the transcoding. The codec associated with the CC intercepted as per case 1 and case 2 is Codec 1. Further, the codec associated with the CC intercepted as per case 3 is Codec 2. The codec information delivered in the IRI (from S-CSCF) is Codec 2.

As can be seen in FIG. 2, the codec used in the CC intercepted at the P-GW or at IMS-AGW (before the transcoding) does not match the codec information reported in the IRI message. With this, the LEA may have difficulty in the handling of the media from the received CC. Further, when the CC is intercepted at the IMS-AGW, the 3GPP standards do not define where exactly the interception is to be performed (before or after the transcoding).

Figure 3:
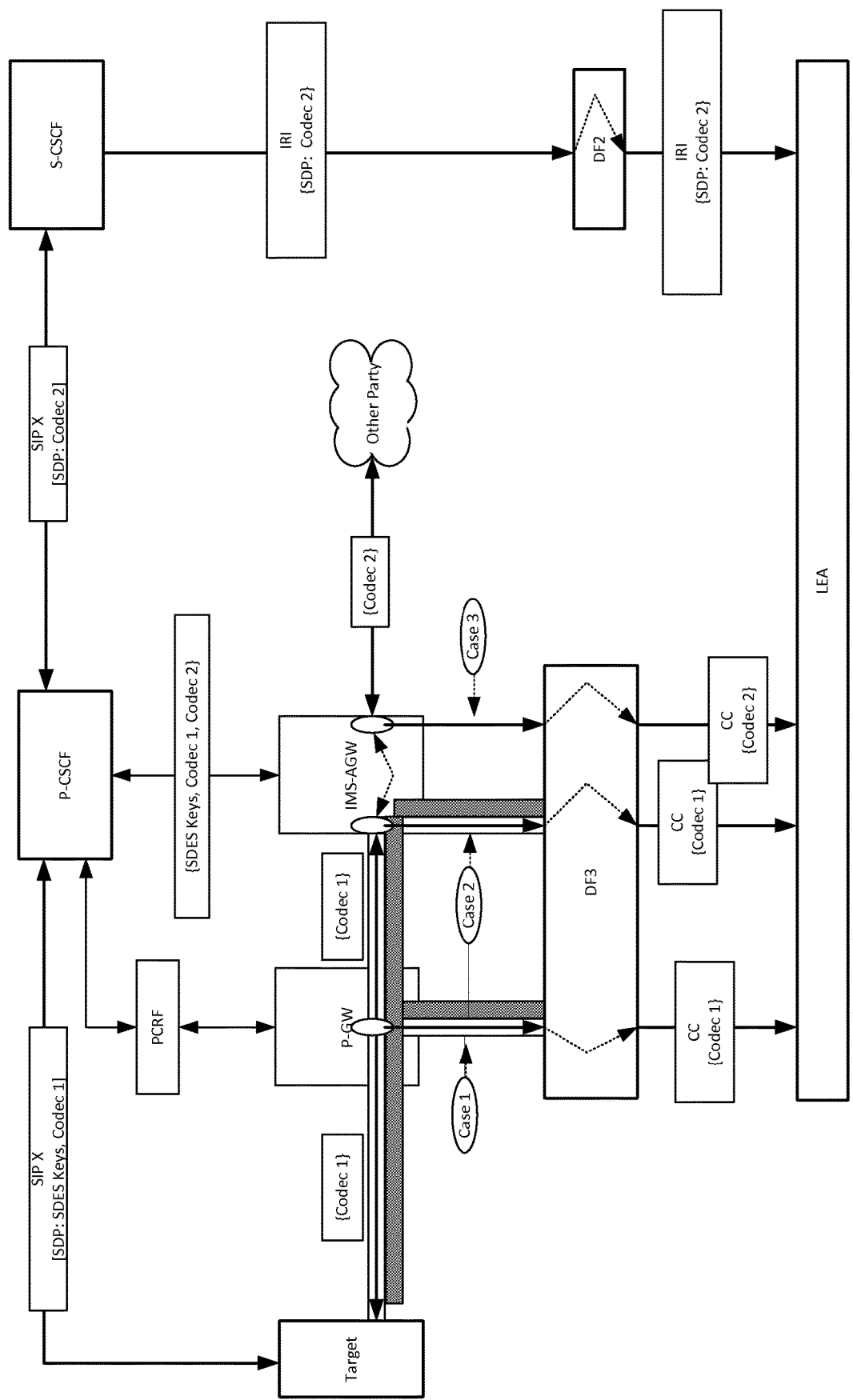
FIG. 3 illustrates three examples of CC interception with e2ae encryption and transcoding.

FIG. 3 illustrates three examples of CC interception with e2ae encryption and transcoding. In this example, the transcoding scenario is the same as in FIG. 2. Additionally, in this example, the media is encrypted from the Target until the IMS-AGW. As shown in FIG. 2, there are three possible interception points for CC. The S-CSCF sends the IRI to the DF2 that includes the SDP information containing the Codec 2 information.

As can be seen in FIG. 3, the CC is intercepted in an encrypted form in case 1 and case 2, and in a decrypted form in case 3. In FIG. 3, the S-CSCF does not have SDES keys. In the case where the CC interception is performed at the IMS-AGW, the 3GPP standards do not define where exactly the interception is to be performed (before or after the encryption). Further, in other embodiments, the e2ae encryption can also be done using other key management protocols for SRTP such as Datagram Transport Layer Security (DTLS, RFC 5764) being used in the case of WebRTC.

Figure 4:
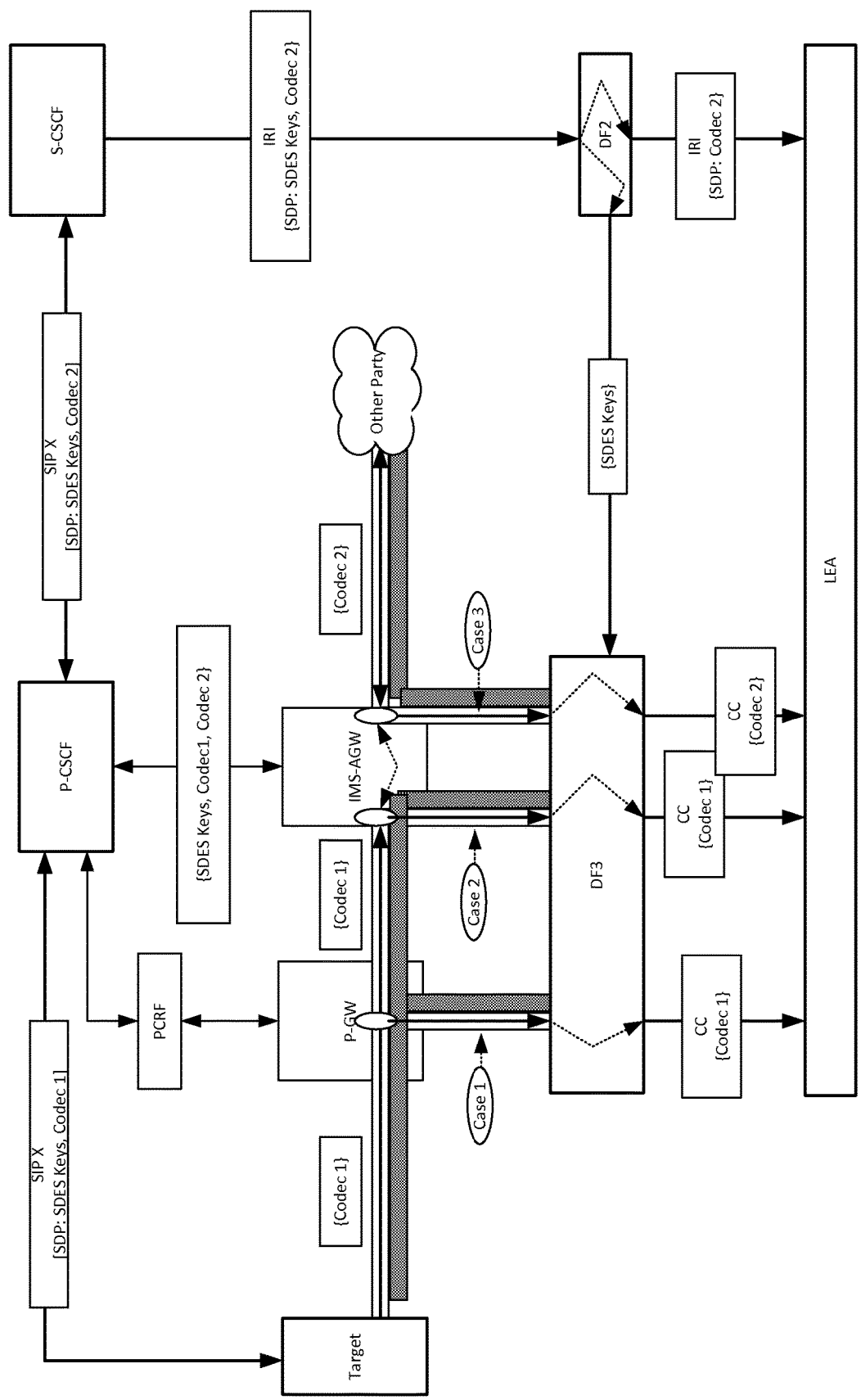
FIG. 4 illustrates three examples of CC interception with e2e encryption and transcoding.

FIG. 4 illustrates three examples of CC interception with e2e encryption and transcoding. In this example, the transcoding scenario is the same as in FIG. 2 but since the media is e2e encrypted, the IMS-AGW decrypts the media, and performs a transcoding and then re-encrypts the media. As in FIG. 1, three possible interception points for CC are shown in FIG. 4. The S-CSCF sends the IRI to the DF2. The IRI also includes SDP information containing the Codec 2 information. Further, the S-CSCF delivers the SDES keys to the DF2, which in turn passes the SDES keys on to the DF3.

As can be seen in FIG. 4, the CC is intercepted in an encrypted form in all three cases. In this example, the codec associated with the CC intercepted at the P-GW or at IMS-AGW (before the transcoding) does not match the codec information reported in the IRI message. As in the case shown in FIG. 2, even with this, the LEA may have difficulty in the handling of the media from the received CC.

In the case where the CC interception is performed at the IMS-AGW, the 3GPP standards do not define where exactly the interception is to be performed (before or after the encryption). Also, the SDES keys on the two sides of the IMS-AGW can be different, and the S-CSCF may have access to the SDES keys used for encrypting the media between the IMS-AGW and the other party.

In the examples shown in FIGS. 2-4, if the media is intercepted at the egress side of the IMS-AGW (case 3), then the codec associated with the intercepted CC will match the codec information delivered in the IRI. Also, in FIG. 3, the media is intercepted (case 3) in a decrypted form and therefore, not having the SDES keys at S-CSCF may not be an issue. In FIG. 4, the media is intercepted (case 3) in an encrypted form, but in this case, the S-CSCF does have the keys. Further, in the case where the CC is intercepted at the egress side of the IMS-AGW, one has to note that the intercepted media is not the media sent to and received from the Target subscriber.

Figure 5:
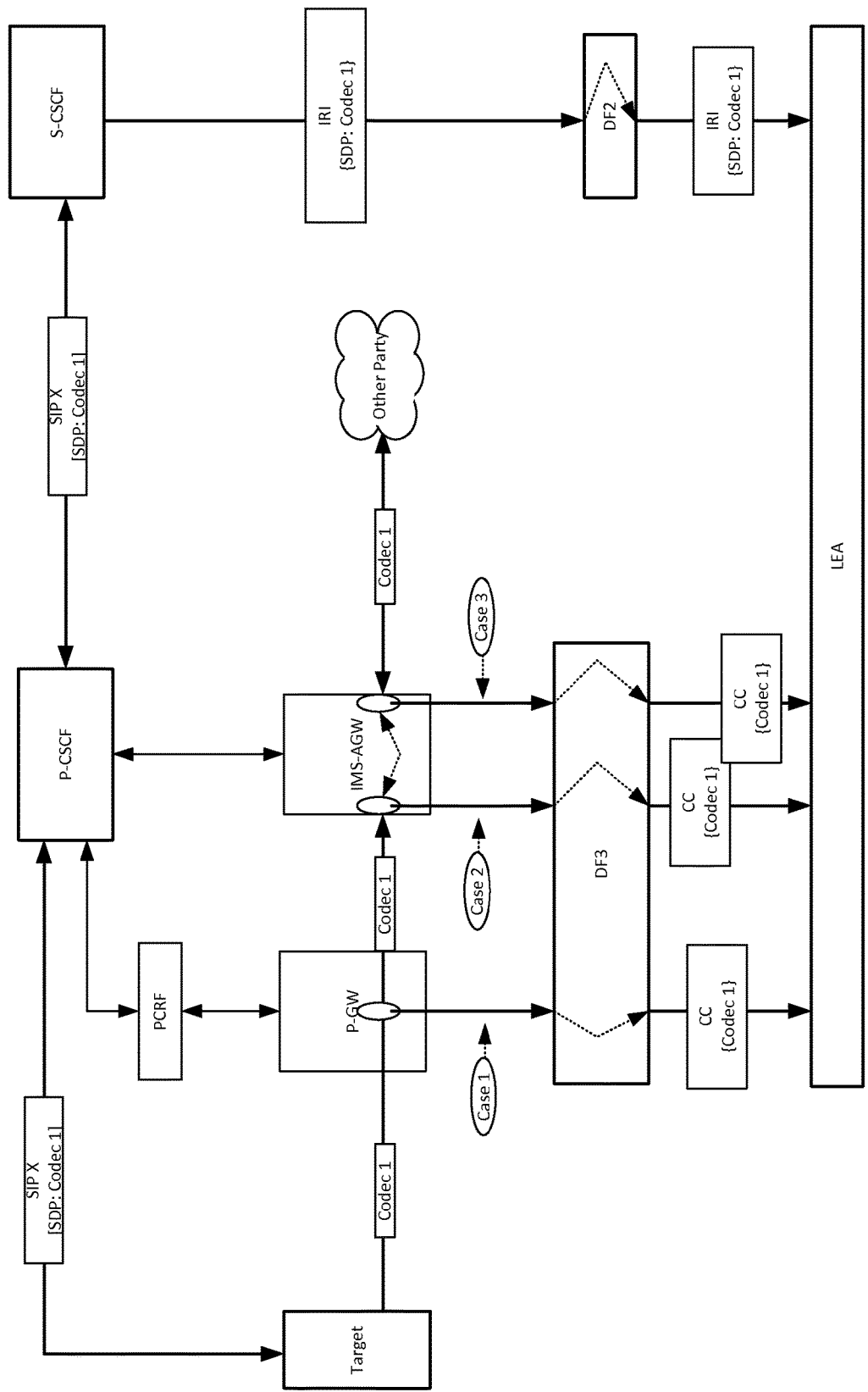
FIG. 5 illustrates three examples of CC interception with no transcoding of the media.

The 3GPP standards by and large considered the case shown in FIG. 5 where there is no transcoding performed on the media. In particular, FIG. 5 illustrates three examples of CC interception with no transcoding of the media. In this example, the media is not transcoded. Codec 1 is used between the Target and the IMS-AGW and between the IMS-AGW and the other party of communication. Three possible interception points are shown in FIG. 5. In case 1, the CC interception is done at the P-GW. In case 2 and case 3 the CC interception is done at IMS-AGW. The codec associated with the CC intercepted is Codec 1 in all three cases. Further, the codec information delivered in the IRI (from S-CSCF) is Codec 1.

As can be seen in FIG. 5, the codec used in the CC intercepted at the P-GW or at IMS-AGW matches the codec information reported in the IRI message. However, as illustrated in FIG. 2, this may not be the only case.

Figure 6:
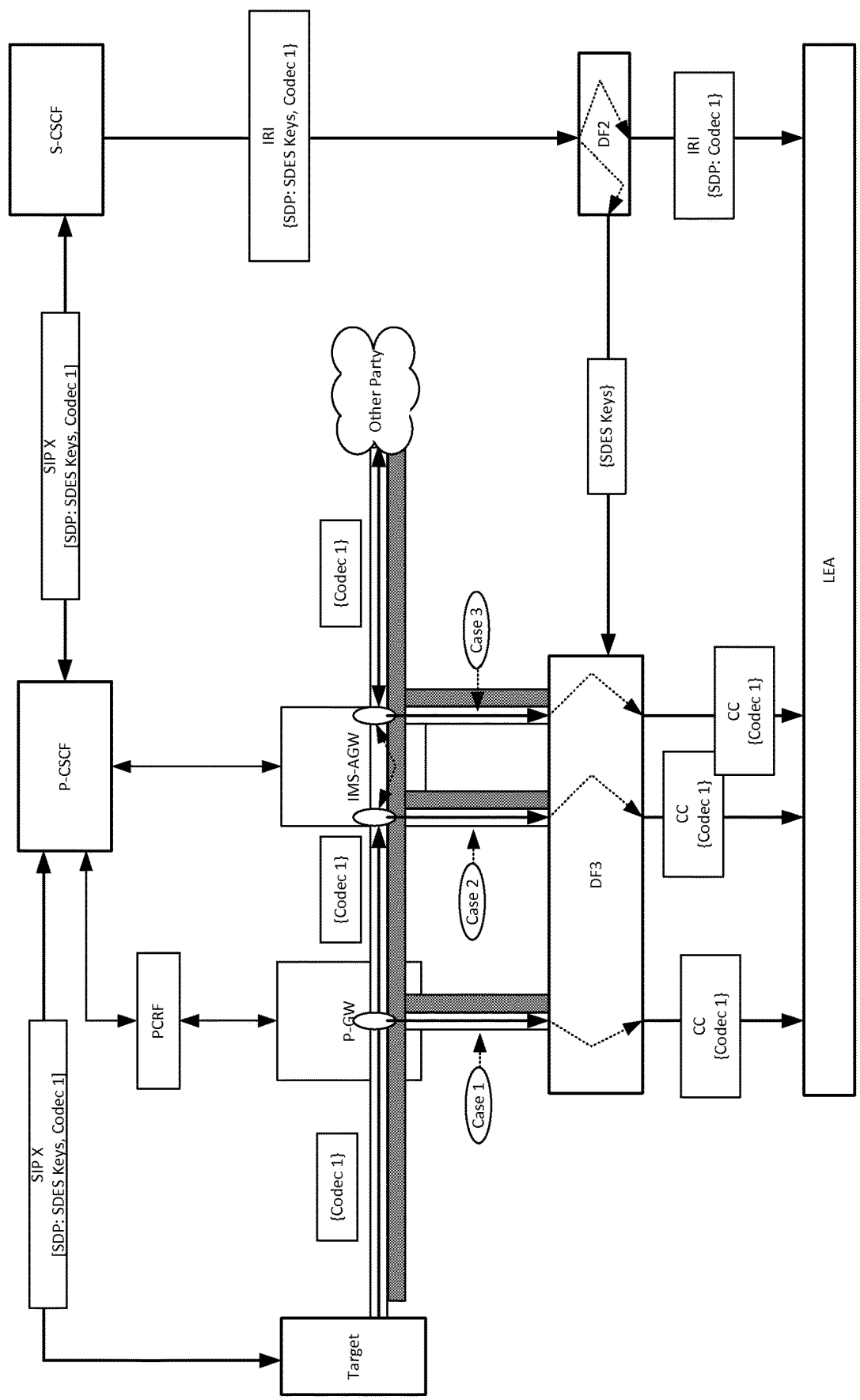
FIG. 6 illustrates three examples of CC interception with e2e encryption and no transcoding of the media.

As far as the media encryption is concerned, the 3GPP standards by and large considered the case shown in FIG. 6. In particular, FIG. 6 illustrates three examples of CC interception with e2e encryption, with no transcoding of the media. In this example, the media is encrypted e2e and not transcoded. In particular, Codec 1 is used between the Target and the IMS-AGW, and Codec 1 is used between the IMS-AGW and the other party of communication. Three possible interception points for CC are shown in FIG. 6. In case 1, the CC interception is done at the P-GW. In Case 2 and case 3, the CC interception is done at the IMS-AGW. The codec associated with the CC intercepted is Codec 1 in all three cases. Further, the codec information delivered in the IRI (from S-CSCF) is Codec 1. Additionally, the S-CSCF provides the SDES keys to the DF2, which in turn passes the SDES keys onto the DF3.

As can be seen in FIG. 6, the codec information associated with the CC intercepted at the P-GW or at IMS-AGW matches the codec information reported in the IRI message. The S-CSCF does have access to the SDES keys. However, as illustrated in FIG. 4, this may not be the only case.

The e2e encryption can also be done during other key management protocols for SRTP, such as multimedia Internet KEYing (MIKEY) (RFC 6043). It is assumed that there is no transcoding done in the methods illustrated in FIGS. 5 and 6. The e2ae encryption related problems are partially solved through the recent change requests (CRs) where two statements were added to the 3GPP TS 33.107 in the clause that discusses IMS media plane security.

In one statement, if an ICE in the telecommunications service provider (TSP) IMS network using Security options [25], allows interception of Content of Communication in clear, then this clause does not apply. In the second statement, when SDES is used in end-to-access edge mode, the P-CSCF shall intercept SDES keys from SDP messages and shall deliver them to the DF2.

Figure 7:
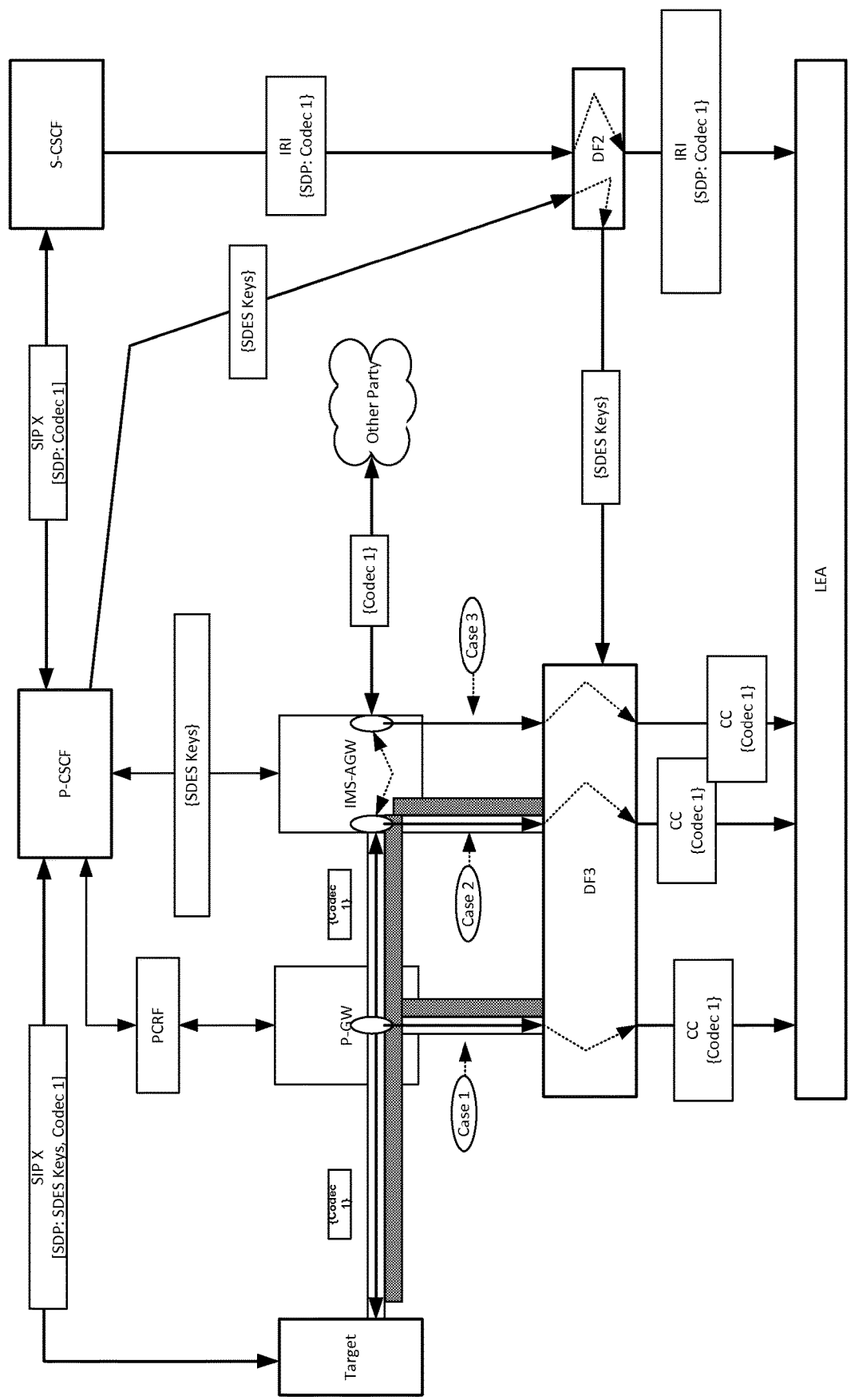
FIG. 7 illustrates three examples of CC interception with e2ae encryption and no transcoding.

The first point address case 3 (where CC is intercepted in a decrypted form) and hence, the procedures described in 3GPP TS 33.107 do not apply. The second point addresses case 1 and case 2 and requires the P-CSCF to send the SDES keys to the DF2. FIG. 7 below captures this point where P-CSCF sends the SDES keys to the DF2, and DF2 delivers the SDES keys to the DF3.

FIG. 7 illustrates three examples of CC interception with e2ae encryption and no transcoding. In this example, the media is encrypted from the Target until the IMS-AGW, and there is no transcoding involved in this example. Further, three possible interception points for CC are shown in FIG. 7. The S-CSCF in FIG. 7 sends the IRI to the DF2 that includes the SDP information containing Codec 1 information. As per the recent change to 3GPP TS 33.107, the P-CSCF sends the SDES keys to the DF2, which in turn passes the same SDES keys to the DF3.

As can be seen in FIG. 7, the codec information associated with the CC intercepted at the P-GW or at IMS-AGW matches the codec information reported in the IRI message. Further, the P-CSCF sends the SDES keys to the DF2. However, as illustrated in FIG. 3, this may not be the only case.

Certain embodiments of the present invention may include a CC intercept trigger function and a CC intercept function. The CC intercept trigger function may send a CC intercept trigger to the CC intercept function and therefore, the CC intercept trigger function may provide information pertaining to the media to the DF2. Such media information may include SDES keys and codec information. The CC intercept trigger function may be aware of the fact whether it is a P-GW that provides the CC interception or an IMS-AGW that provides the CC interception. In the latter case, the CC intercept trigger may be aware of whether the ingress side of the IMS-AGW or the egress side of the IMS-AGW that performs the CC interception. Accordingly, the CC intercept trigger function can send the appropriate media information to the DF2.

Figure 8:
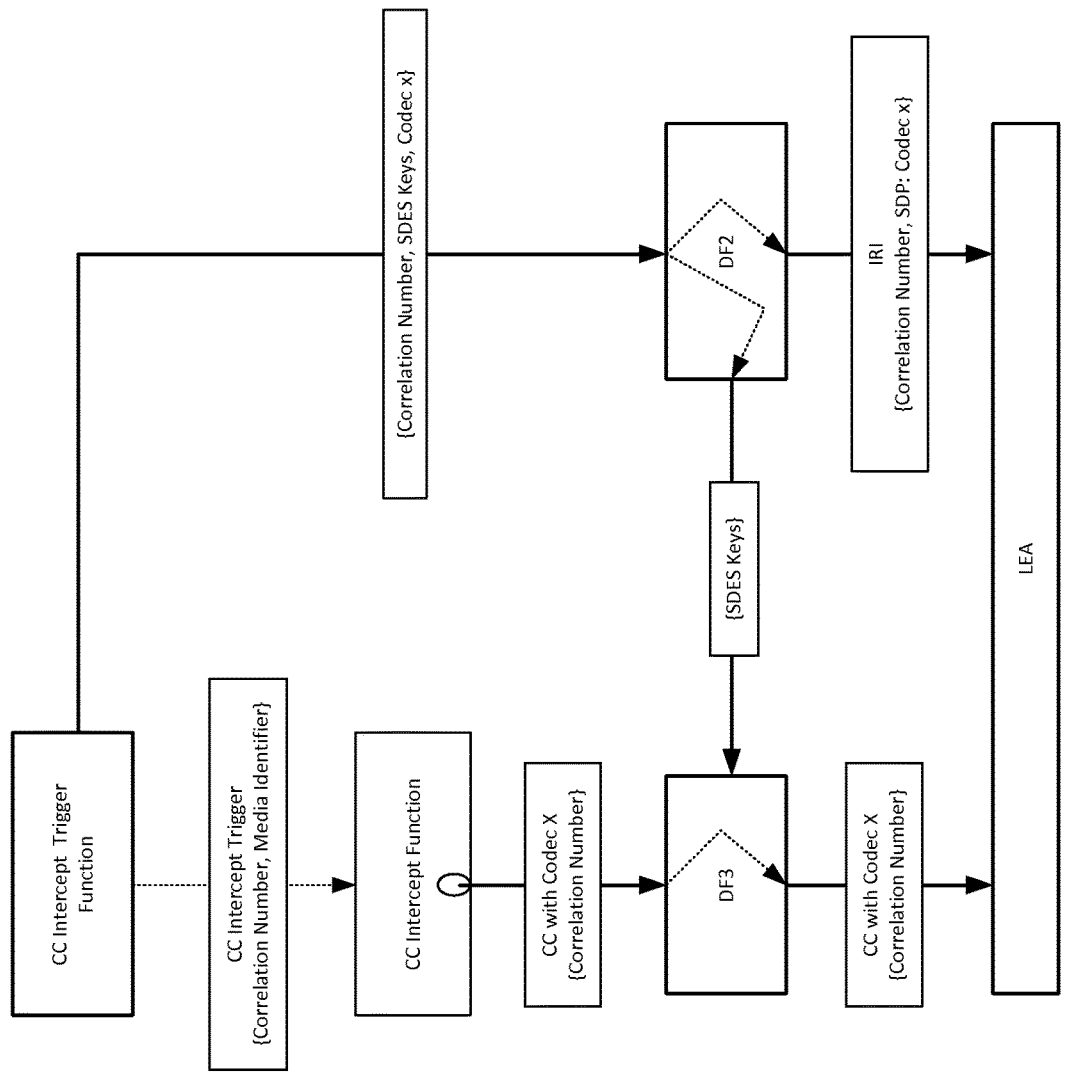
FIG. 8 illustrates an example of CC interception, according to certain embodiments.

FIG. 8 illustrates an example of CC interception, according to certain embodiments. As shown in FIG. 8, the CC intercept trigger function may send SDES keys, codec information and the correlation number to the DF2. The DF2 may forward the SDES keys to the CC intercept function and pass the correlation number and codec information to the LEA.

In the event that the CC is intercepted in a decrypted form, the CC intercept trigger function may decide not to pass SDES keys to the DF2. The concept presented in certain embodiments is not limited to the case of CC interception performed at a P-GW or at an IMS-AGW. For example, the concept presented in certain embodiments may be applicable even if the CC interception is performed at the TrGW, IM-MGW or at the media resource function (MRF). The concept may modify the hitherto concept of VoIP interception where it is understood that all IRI is sent by the S-CSCF in a non-roaming scenario. According to an embodiment, the CC intercept trigger function (which may be, according to certain embodiments, a P-CSCF, IBCF, MGCF or S-CSCF) may send a part of the IRI to the DF2. The DF2 may suppress the similar information received from the S-CSCF before delivering the IRI to the LEA.

Embodiments of the invention presented herein are not limited to the case of SDES key management. Certain embodiments may be applied to cases where other methods of key management are used. Examples of other methods of key management may include the case of MIKEY ticket where the keys are retrieved (by DF2) from the key management service (KMS) and the case of DTLS-SRTP used for WebRTC where the key management is done in-band with the media. In these other cases, the CC intercept trigger function passing the SDES keys to the DF2 may not apply. However, in all those other cases where passing of the keys from CC intercept function to DF2 is not required, the CC intercept trigger function may still pass the codec information to the DF2. The DF2 may use the codec information received from the CC intercept trigger function in the IRI messages sent to the LEA.

Figure 9:
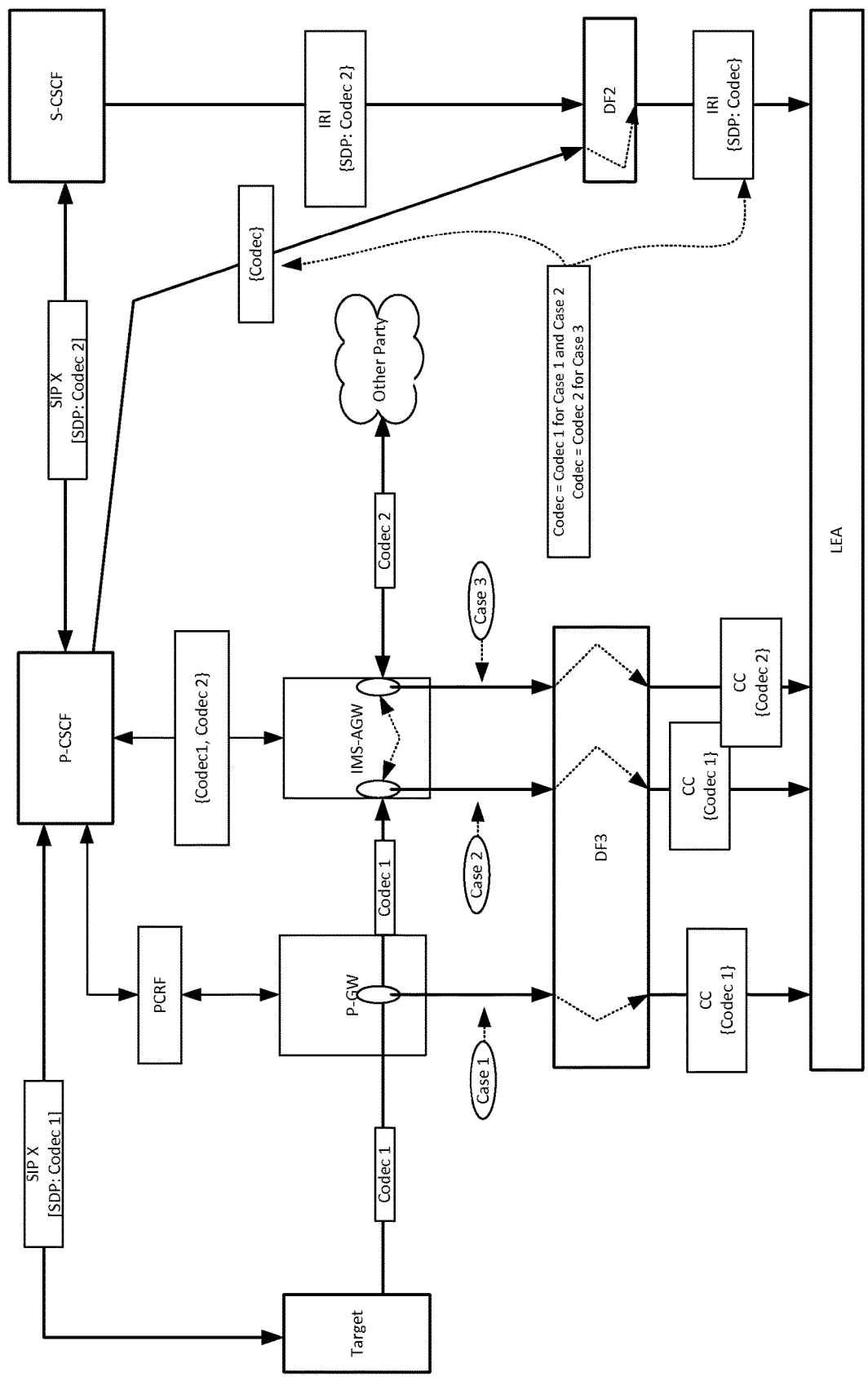
FIG. 9 illustrates three examples of CC interception with media transcoding, according to certain embodiments.

FIG. 9 illustrates three examples of CC interception with media transcoding, according to certain embodiments. As shown in FIG. 9, the media is transcoded at the IMS-AGW. Codec 1 is used between the Target and the IMS-AGW, and Codec 2 is issued between the IMS-AGW and the other party of communication. Three possible interception points for CC are shown in FIG. 9. In case 1, the CC interception is done at the P-GW (also referred to as PDN-GW). In case 2, the CC interception is done at the IMS-AGW before the transcoding. In case 3, the CC interception is done at the IMS-AGW after the transcoding. The codec associated with the CC intercepted as per case 1 and case 2 is Codec 1. Further, the codec associated with the CC intercepted as per case 3 is Codec 2. The P-CSCF (the CC intercept trigger function) delivers the codec information to the DF2, and DF2 then passes that information to the LEA.

The P-CSCF may include Codec 1 as a part of the media information sent to DF2 if the CC interception is done at the P-GW (case 1) or ingress side of IMS-AGW (case 2). Further, the P-CSCF may include Codec 2 as a part of the media information sent to DF2 if the CC interception is done at the egress side of IMS-AGW (case 3). This enables the codec used by the intercepted CC to match that delivered to the LEA in the IRI messages. FIG. 9 also shows that S-CSCF may include Codec 2 as a part of the media information it sends to the DF2, and the DF2 may decide not to pass this information to the LEA.

In an embodiment, the S-CSCF may suppress the media information from being delivered to the DF2. This embodiment may be advantageous since the DF2 does not have to take additional precaution of removing the media information received from the S-CSCF.

Figure 10:
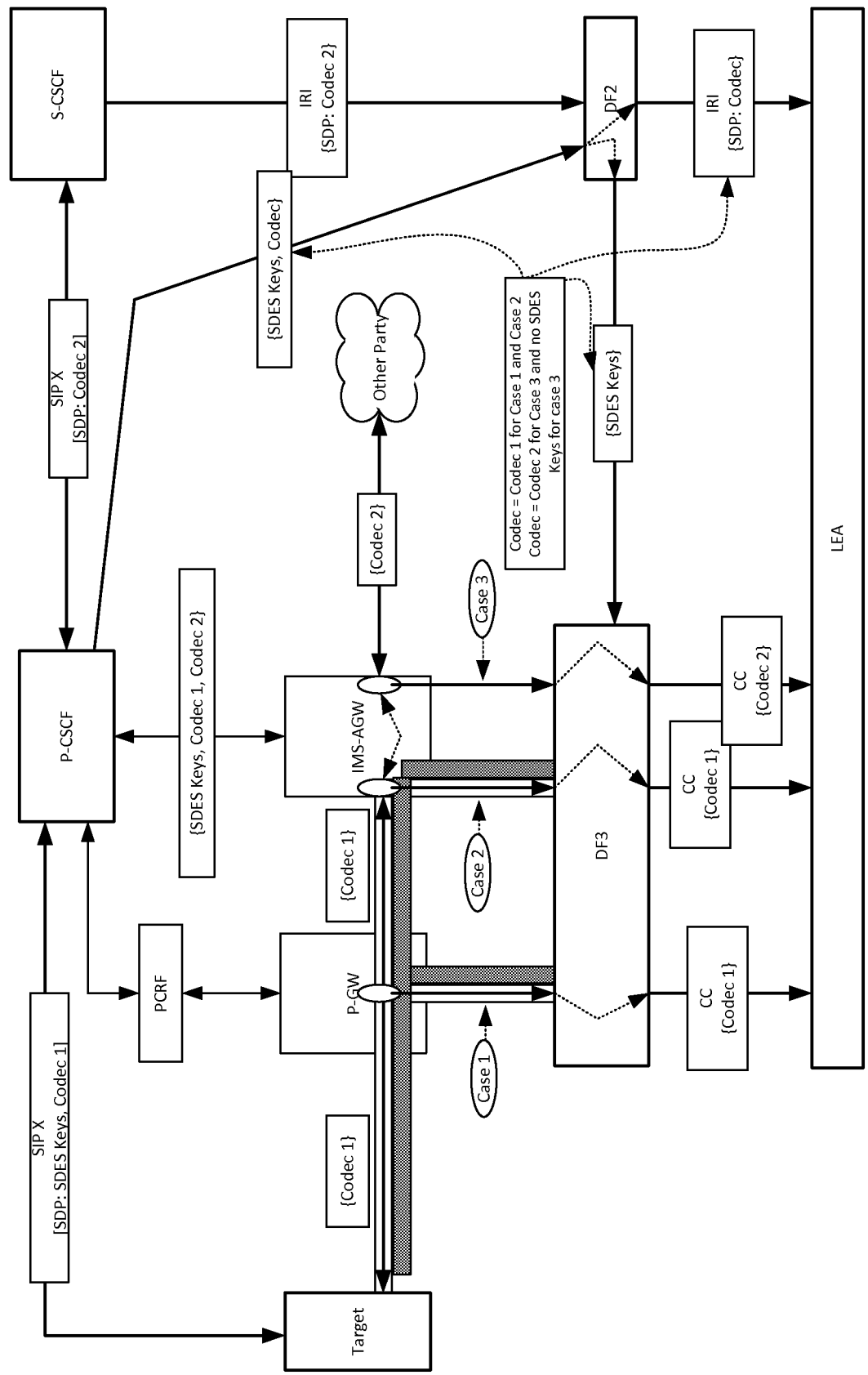
FIG. 10 illustrates three examples of CC interception with e2ae encryption and transcoding, according to certain embodiments.

FIG. 10 illustrates three examples of CC interception with e2ae encryption and transcoding, according to certain embodiments. As shown in FIG. 10, the transcoding scenario is the same as in FIG. 9. Additionally, in FIG. 10, the media is encrypted from the Target until the IMS-AGW. As in FIG. 9, three possible interception points for CC are shown in FIG. 10. The P-CSCF (the CC intercept trigger function) delivers the codec information to the DF2, and the DF2 then passes that information to the LEA. If required, the P-CSCF may also pass the SDES keys information to the DF2, and the DF2 may pass the SDES keys information to the DF3.

As shown in FIG. 10, the CC is intercepted in an encrypted form in case 1 and case 2, and in a decrypted form in case 3. P-CSCF may include SDES keys and Codec 1 as a part of the media information sent to the DF2 if the CC interception is done at the P-GW (case 1) or at the ingress side of the IMS-AGW (case 2). The P-CSCF may also include Codec 2 with no SDES keys as a part of the media information sent to the DF2 if the CC interception is done at the egress side of the IMS-AGW (case 3) since the CC is not intercepted in an encrypted form. As shown in FIG. 10, the codec used by the intercepted CC matches that delivered to the LEA in the IRI messages. FIG. 10 also shows that S-CSCF includes Codec 2 as a part of media information it sends to the DF2, and the DF2 may decide not to pass this information to the LEA.

In an embodiment, the S-CSCF may suppress the media information from being delivered to the DF2. This embodiment may be advantageous since the DF2 does not have take additional precaution of removing the media information received from the S-CSCF.

Figure 11:
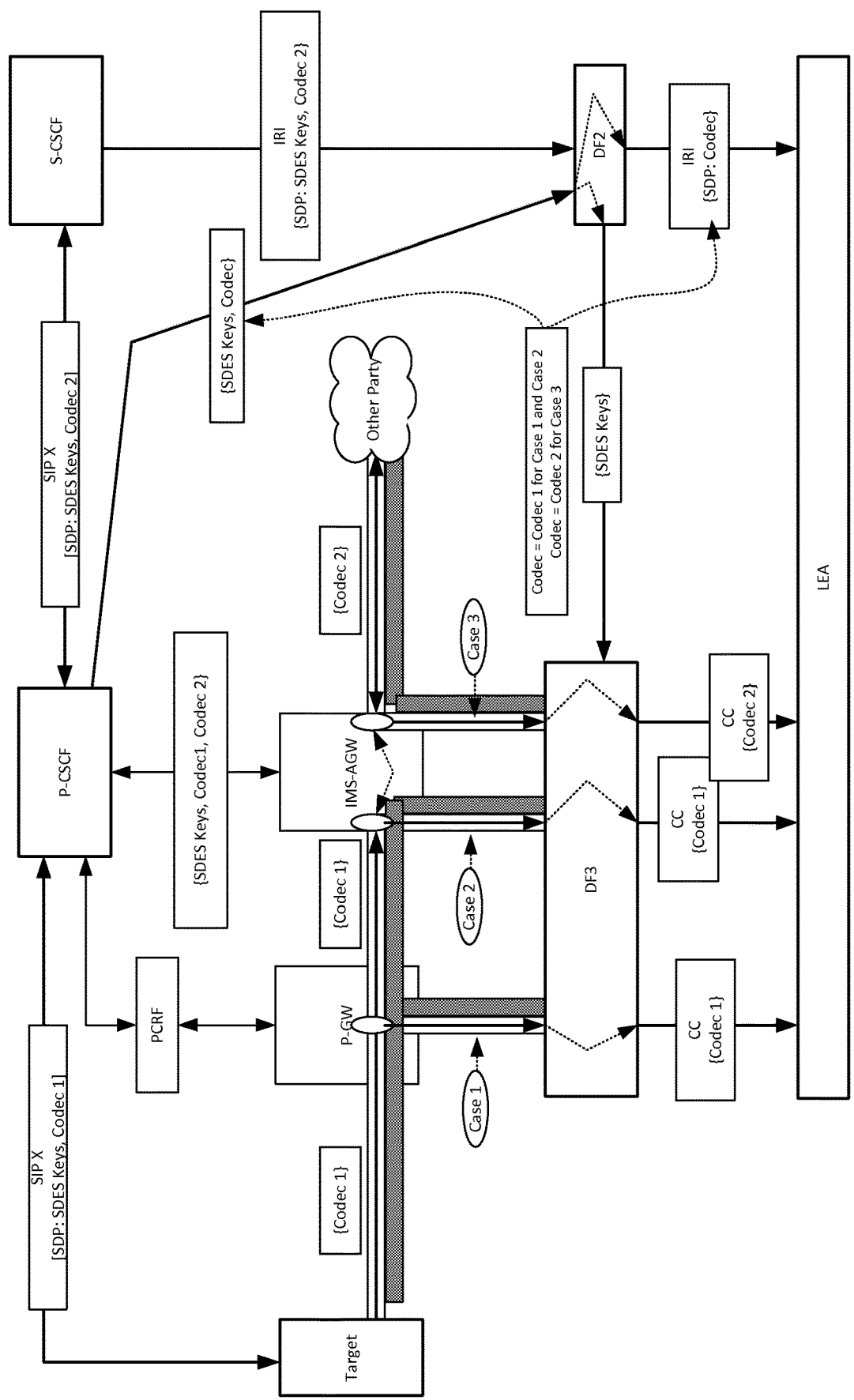
FIG. 11 illustrates three examples of CC interception with e2e encryption and transcoding, according to certain embodiments.

FIG. 11 illustrates three examples of CC interception with e2e encryption and transcoding, according to certain embodiments. As shown in FIG. 11, the transcoding scenario is the same as in FIG. 9. Additionally, in this example, the media is encrypted with e2e. However, the IMS-AGW performs a transcoding of the media. As in FIG. 10, three possible interception points for CC are shown. The P-CSCF (the CC intercept trigger function) delivers the codec information to the DF2, and the DF2 then passes that information to the LEA. The P-CSCF also passes the SDES keys information to the DF2, and the DF2 passes the same SDES keys information to the DF3.

As shown in FIG. 11, the CC is intercepted in an encrypted form in all three cases. P-CSCF includes SDES keys and Codec 1 as a part of the media information sent to the DF2 if the CC interception is done at the P-GW (case 1) or at the ingress side of the IMS-AGW (case 2). Further, the P-CSCF includes SDES keys and Codec 2 as a part of the media information sent to the DF2 if the CC interception is done at the egress side of the IMS-AGW (case 3). The codec used by the intercepted CC matches that delivered to the LEA in the IRI messages. FIG. 11 also shows that S-CSCF includes SDES keys and Codec 2 as a part of media information it sends to the DF2, and the DF2 may decide not to pass these information to the LEA. DF2 may also decide not to use the SDES keys received from the S-CSCF while communicating with the DF3.

In an embodiment, the S-CSCF may suppress the media information from being delivered to the DF2. This embodiment may be advantageous since the DF2 does not have take additional precaution of removing the media information received from the S-CSCF. This embodiment may also work even if different SDES keys are in use for the encrypted media across the IMS-AGW because the P-CSCF can determine and send the appropriate SDES keys to the DF2.

Figure 12:
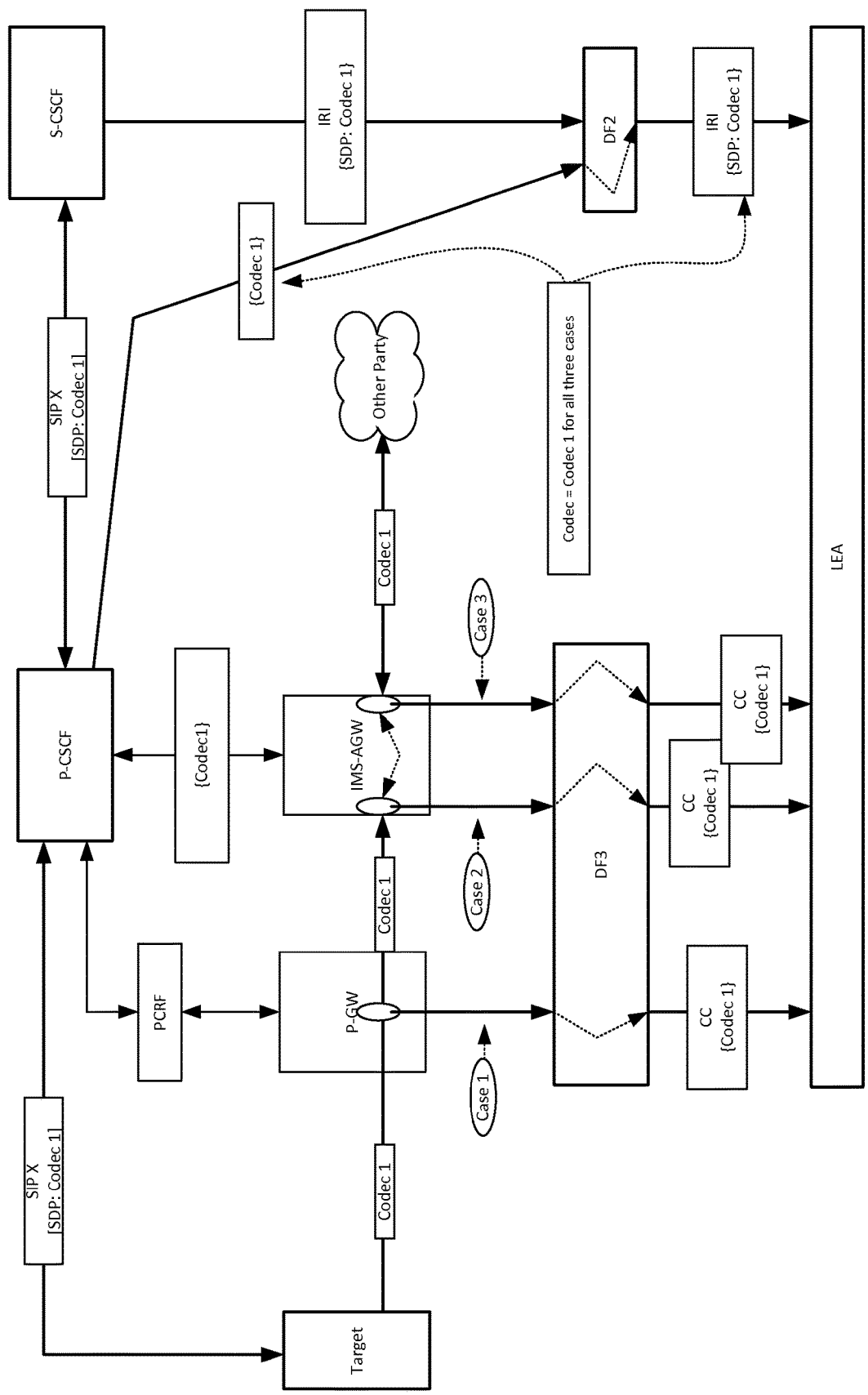
FIG. 12 illustrates three examples of CC interception with no transcoding of the media, according to certain embodiments.

Certain embodiments of the present invention may also be applicable in other cases where there are no problems with transcoding, interception, matching of codecs or providing SDES keys. For example, FIG. 12 illustrates three examples of CC interception with no transcoding of the media. As shown in FIG. 12, the media is not transcoded nor encrypted. Codec 1 is used between the Target and the IMS-AGW, and Codec 1 is used between the IMS-AGW and the other party of the communication. Further, three possible interception points for CC are shown. In case 1, the CC interception is done at the P-GW. In case 2 and case 3, the CC interception is done at the IMS-AGW. The codec associated with the CC intercepted is Codec 1 in all three cases. The P-CSCF (the CC intercept trigger function) delivers the codec information to the DF2, and the DF2 passes that information to the LEA.

As shown in FIG. 12, the CC is intercepted in an unencrypted form in all three cases and there is no transcoding involved. P-CSCF includes Codec 1 as a part of the media information sent to the DF2 for all three cases. Further, the codec used by the intercepted CC matches that delivered to the LEA in the IRI messages. FIG. 12 also shows that S-CSCF includes Codec 1 as a part of media information it sends to the DF2, and DF2 may decide not to pass this information to the LEA.

In an embodiment, the S-CSCF may suppress the media information from being delivered to the DF2. This embodiment may be advantageous since the DF2 does not have take additional precaution of removing the media information received from the S-CSCF.

Figure 13:
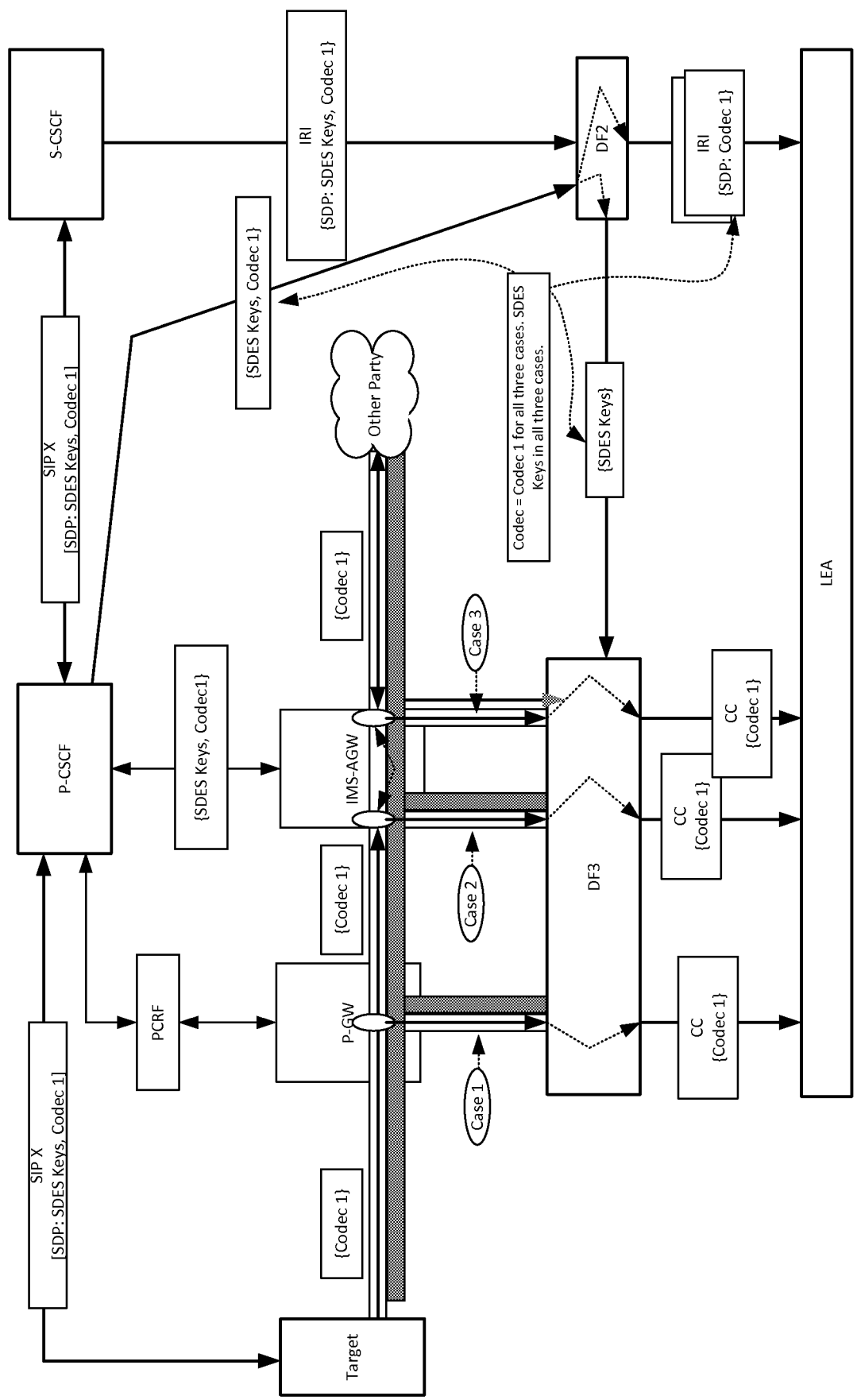
FIG. 13 illustrates three examples of CC interception with no transcoding of the media, but with e2e encryption, according to certain embodiments.

FIG. 13 illustrates three examples of CC interception with no transcoding of the media, but with e2e encryption. As shown in FIG. 13, the media is encrypted e2e, and there is no transcoding involved in this example. Three possible interception points are shown. In case 1, the CC interception is done at the P-GW. In case 2 and case 3, the CC interception is done at the IMS-AGW. The codec associated with the intercepted CC is Codec 1 in all three cases. The P-CSCF (the CC intercept trigger function) delivers the codec information to the DF2. The P-CSCF also delivers the SDES keys to the DF2, and the DF2 passes that information to the LEA. The DF2 also passes the SDES keys to the DF3.

As shown in FIG. 13, the CC is intercepted in an encrypted form in all three cases and there is no transcoding involved here. P-CSCF includes SDES keys and Codec 1 as a part of the media information sent to the DF2 for all three cases. Further, the codec used by the intercepted CC matches that delivered to the LEA in the IRI messages. FIG. 13 also shows that S-CSCF includes SDES keys and Codec 1 as a part of media information it sends to the DF2. The DF2 may decide not to pass this information to the LEA.

In an embodiment, the S-CSCF may suppress the media information from being delivered to the DF2. This embodiment may be advantageous since the DF2 does not have take additional precaution of removing the media information received from the S-CSCF. This embodiment may also be applicable even if different SDES keys are in use for the encrypted media across the IMS-AGW because the P-CSCF can determine and send the appropriate SDES keys to the DF2.

Figure 14:
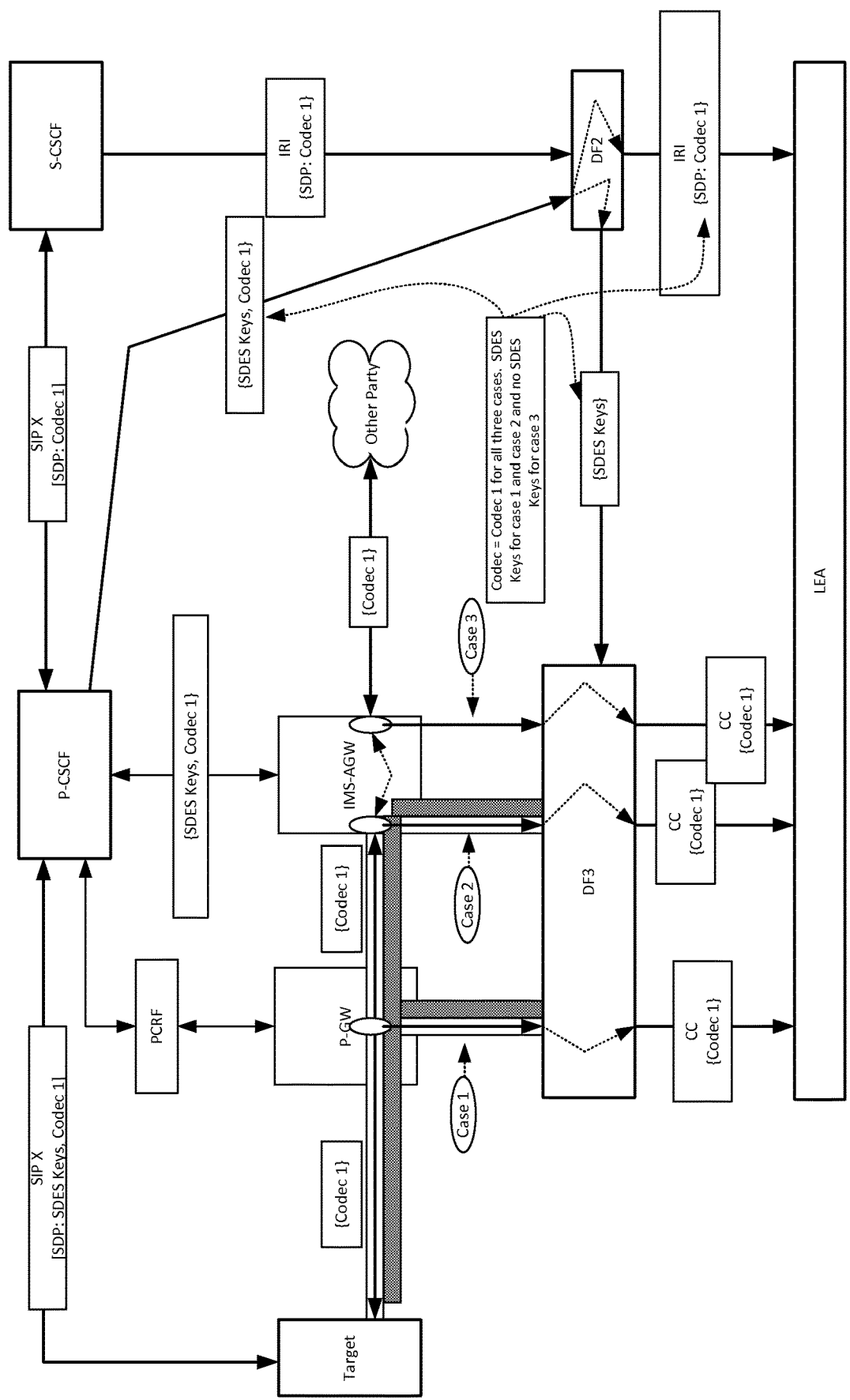
FIG. 14 illustrates three examples of CC interception with no transcoding of the media, but with e2ae encryption, according to certain embodiments.

FIG. 14 illustrates there examples of CC interception with no transcoding of the media, but with e2ae encryption. As shown in FIG. 14, the media is encrypted from the Target until the IMS-AGW, and there is no transcoding involved. Three possible interception points for CC are shown. The codec associated with the intercepted CC is Codec 1 in all three cases. The P-CSCF (the CC intercept trigger function) delivers the SDES keys (for case 1 and case 2) and the codec information to the DF2. The DF2 passes the SDES keys information to the DF3, and the DF2 passes the codec information to the LEA.

As shown in FIG. 14, the CC is intercepted in an encrypted form in case 1 and in case 2 and in an unencrypted form in case 3, and there is no transcoding involved. P-CSCF includes SDES keys and Codec 1 as a part of the media information sent to the DF2 for case 1 and case 2. The P-CSCF also includes the Codec 1 as a part of the media information sent to DF2. Further, the codec used by the intercepted CC matches that delivered to the LEA in the IRI messages. FIG. 14 also shows that S-CSCF includes Codec 1 as a part of media information it sends to the DF2, and the DF2 may decide to not pass this information to the LEA.

In an embodiment, the S-CSCF may suppress the media information from being delivered to the DF2. This embodiment may be advantageous since the DF2 does not have take additional precaution of removing the media information received from the S-CSCF.

Figure 15:
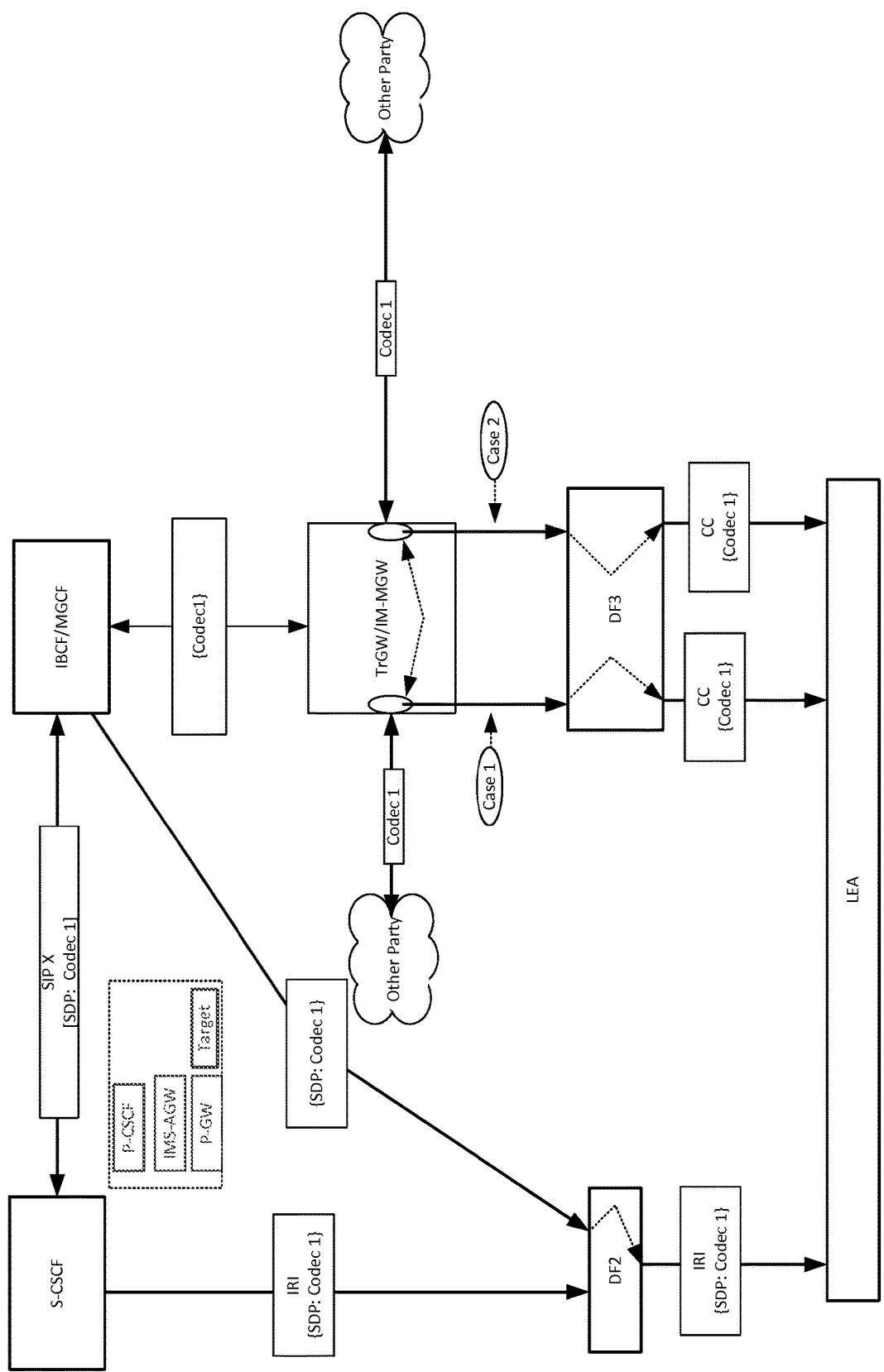
FIG. 15 illustrates two examples of CC interception with no transcoding of the media, according to certain embodiments.

FIG. 15 illustrates two examples of CC interception with no transcoding of the media. As shown in FIG. 15, the media is not transcoded. Three possible interception points for CC are shown, and two examples of CC interception are shown. The codec used by the intercepted CC is Codec 1 in both cases. The IBCF/MGCF (the CC intercept trigger function) delivers the codec information to the DF2, and the DF2 passes the codec information to the LEA.

As shown in FIG. 15, the CC is intercepted in an unencrypted form in both cases, and there is no transcoding involved. IBCF/MGCF includes Codec 1 as a part of the media information sent to the DF2. The codec used by the intercepted CC matches that delivered to the LEA in the IRI messages. FIG. 15 also shows that the S-CSCF includes Codec 1 as a part of media information it sends to the DF2, and the DF2 may decide not to pass this information to the LEA.

In an embodiment, the S-CSCF may suppress the media information from being delivered to the DF2. This embodiment may be advantageous since the DF2 does not have take additional precaution of removing the media information received from the S-CSCF. This embodiment may also be applicable even if the media is encrypted or transcoding occurs at the TrGW/IM-MGW because the IBCF/MGCF can determine and send the appropriate codec information and, if required, the SDES keys to the DF2.

Figure 16:
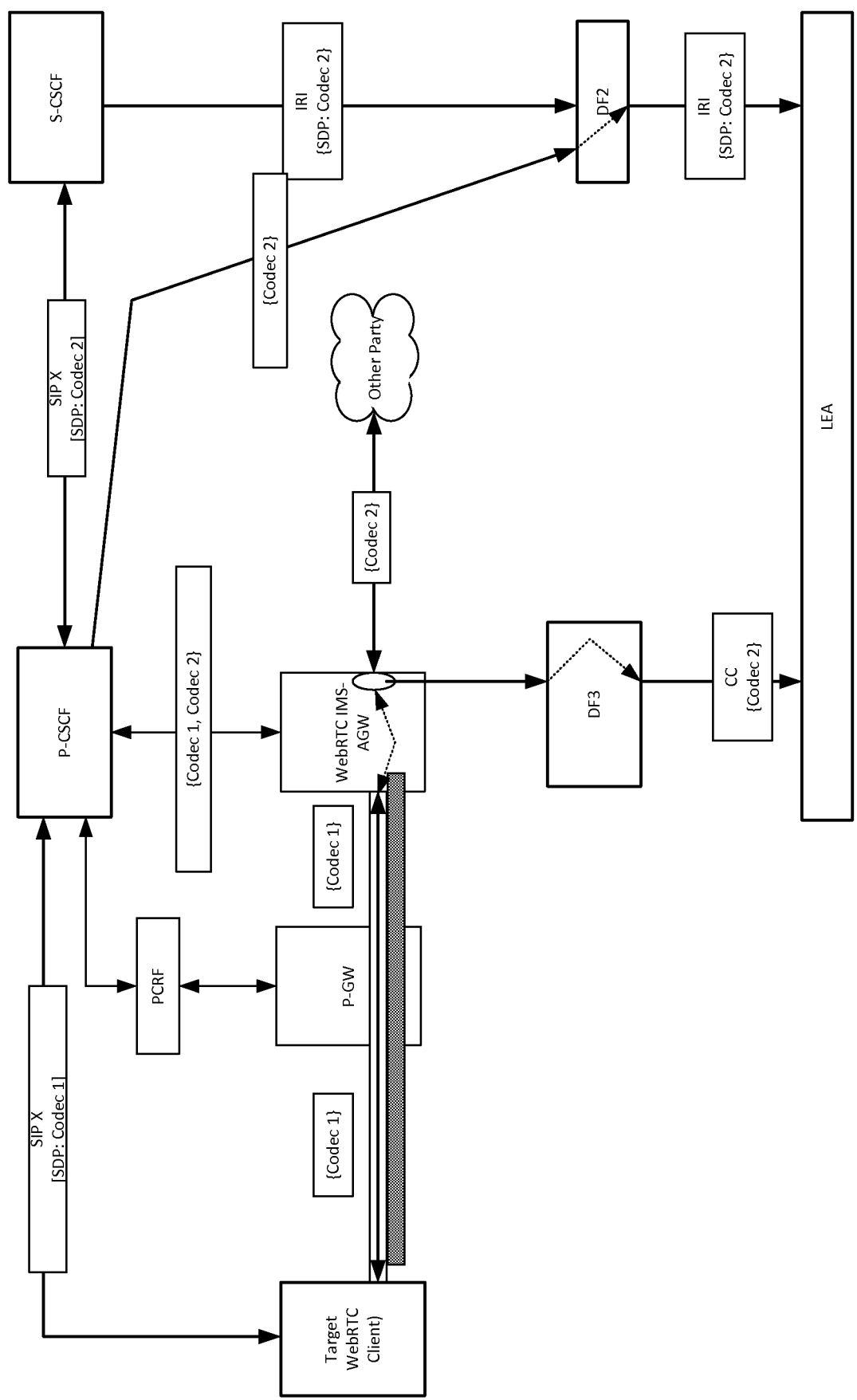
FIG. 16 illustrates a WebRTC example of CC interception with e2ae encryption and transcoding, according to certain embodiments.

FIG. 16 illustrates WebRTC examples of CC interception with e2ae encryption and transcoding. As shown in FIG. 16, the transcoding scenario is the same as in FIG. 10 with the media encrypted from the Target to the WebRTC IMS-AGW. Unlike FIG. 10, only one possible interception point for CC is shown, which is shown as Case 3 in FIG. 10. WebRTC-IMS scenarios may typically involve transcoding and the P-CSCF (the CC intercept trigger function) delivers the Codec 2 information to the DF2 for forwarding to the LEA.

As shown in FIG. 16, the CC is intercepted in a decrypted form. Case 1 and case 2 (shown in FIG. 10) cannot be applied to the WebRTC-IMS case because in-band DTLS key management is used for SRTP. Further, the keys are not available at the SIP signaling level and hence, cannot be passed to the DF2 and cannot be passed to the LEA. In other words, the decryption of the CC cannot be done at the DF3; nor can the CC be delivered in an encrypted form to the LEA. Therefore, the CC interception is done at the egress side of the WebRTC IMS-AGW in a decrypted form. The P-CSCF includes Codec 2 with no keys as a part of the media information sent to the DF2. The codec used by the intercepted CC matches the information delivered to the LEA in the IRI messages.

FIG. 16 also shows that the S-CSCF includes Codec 2 as a part of the media information it sends to the DF2. DF2 may decide not to pass this media information to the LEA. Additionally, in an embodiment, the S-CSCF may suppress the media information from being delivered to the DF2.

Figure 17:
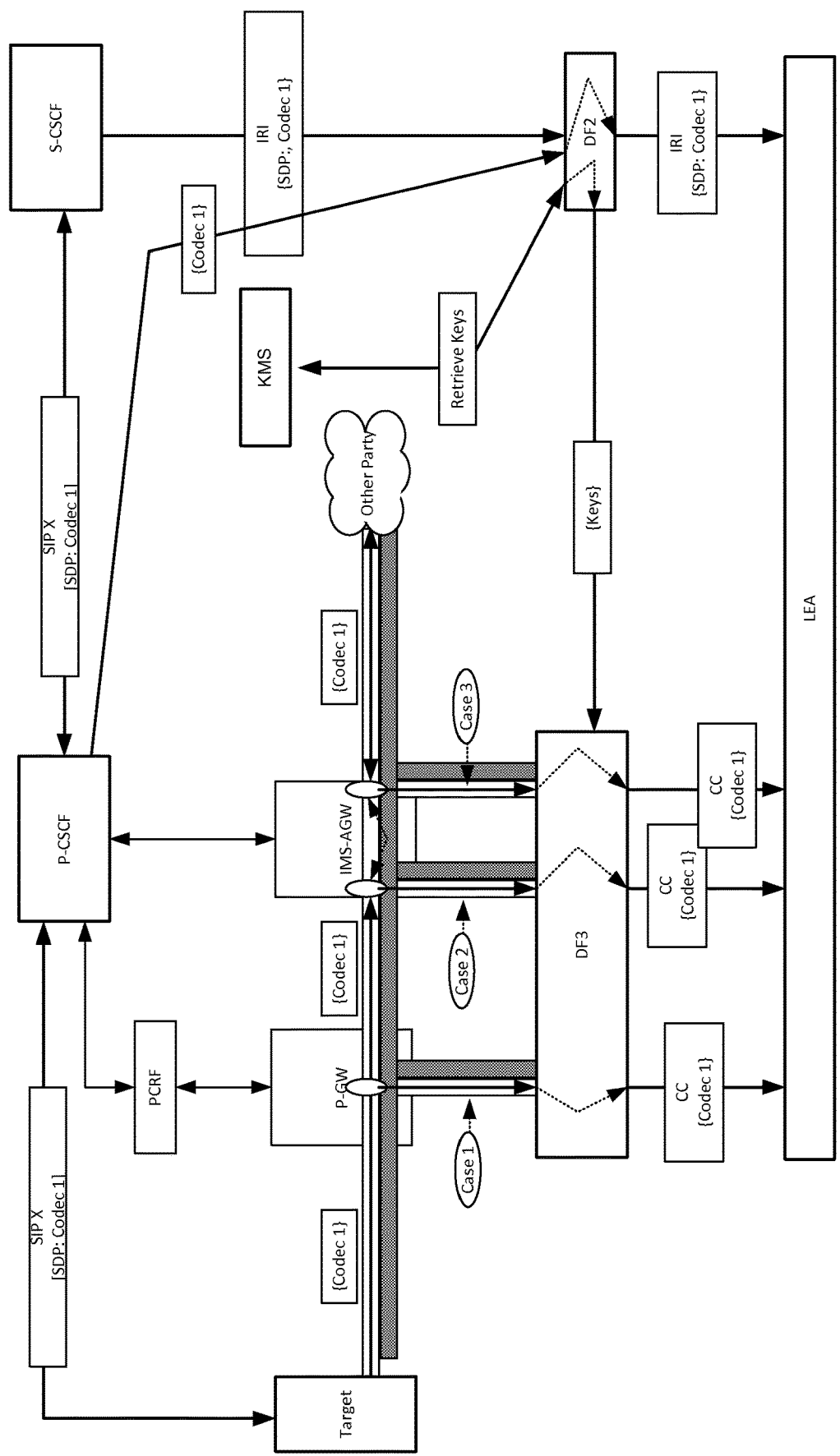
FIG. 17 illustrates three examples of CC interception (MIKEY ticket) with e2e encryption.

FIG. 17 illustrates three examples of CC interception (MIKEY ticket) with e2e encryption. As shown in FIG. 17, the media is encrypted e2e, and there is no transcoding involved. Three possible interception points for CC are shown. In case 1, the CC interception is done at the P-GW. In case 2 and case 3, the CC interception is done at the IMS-AGW. The codec associated with the intercepted CC is Codec 1 in all three cases. Further, the P-CSCF (the CC intercept trigger function) delivers the codec information to the DF2, and the DF2 delivers the codec information to the LEA. The P-CSCF does not deliver the keys in this example because with the MIKEY ticket method, the keys are available at the KMS. Further, the DF2 retrieves the keys from the KMS.

As shown in FIG. 17, the CC is intercepted in an encrypted form in all three cases, and there is no transcoding involved. The P-CSCF includes Codec 1 as a part of the media information sent to the DF2 for all three cases. Further, the codec used by the intercepted CC matches that delivered to the LEA in the IRI messages. FIG. 17 also shows that DF2 retrieves the key-information from the KMS, and passes the retrieved keys to the DF3. FIG. 17 also shows that S-CSCF includes Codec 1 as a part of media information it sends to the DF2, and the DF2 may decide not to pass the information to the LEA.

In an embodiment, the S-CSCF may suppress the media information from being delivered to the DF2. This embodiment may be advantageous since the DF2 does not have take additional precaution of removing the media information received from the S-CSCF.

Figure 18:
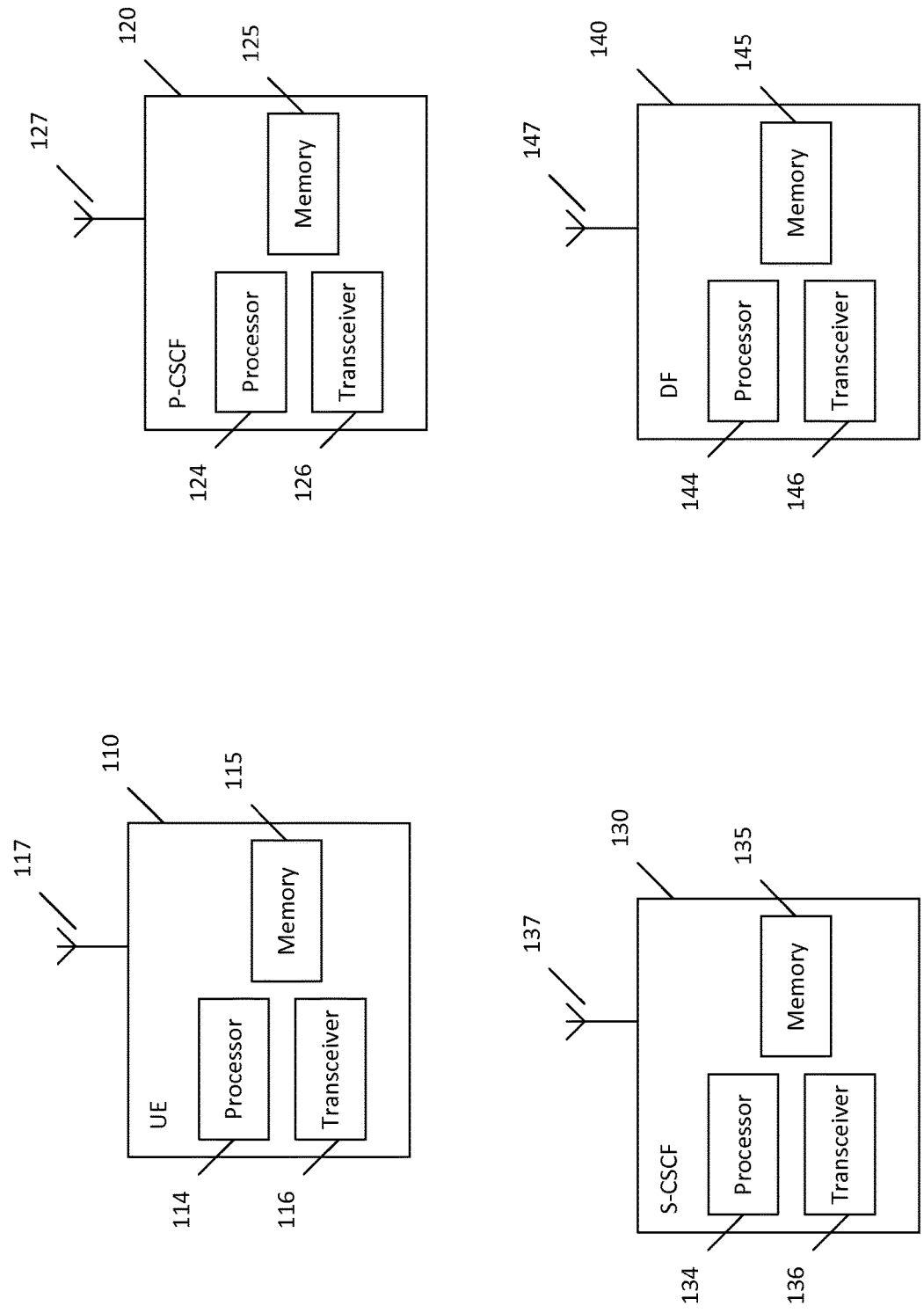
FIG. 18 illustrates a system, according to certain embodiments.
Figure 19:
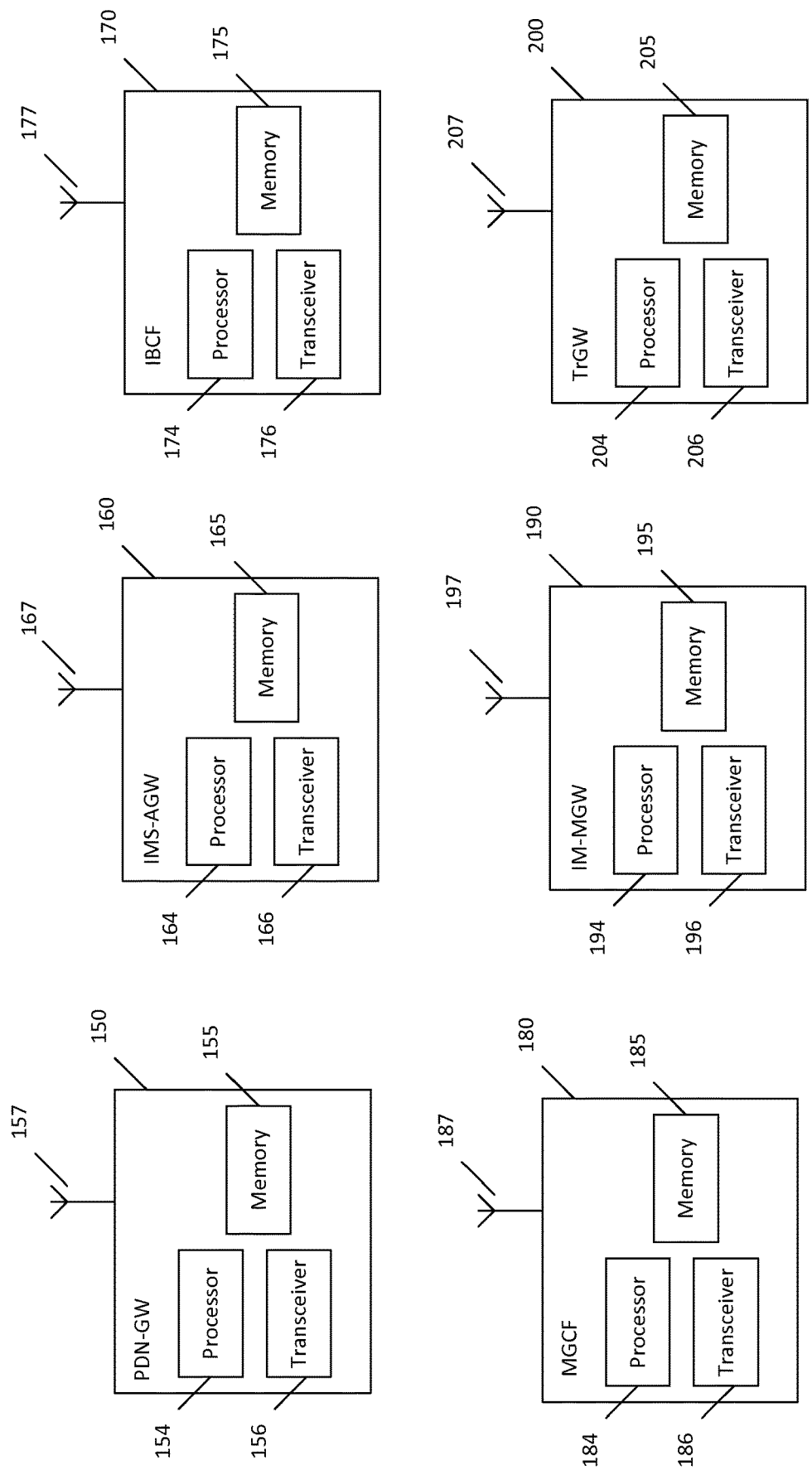
FIG. 19 illustrates the system of FIG. 18 with additional components, according to certain embodiments.

FIGS. 18 and 19 illustrate an example of a system according to certain embodiments. In one embodiment, a system may include multiple devices, such as, for example, at least one UE 110, at least one P-CSCF 120, at least one S-CSCF 130, at least one DF 140, at least one PDN-GW 150, at least one IMS-AGW 160, at least one IBCF 170, at least one MGCF 180, at least one IM-MGW 190, and at least one TrGW 200. Other configurations are also possible.

The UE 110 can be any terminal device, such as a cell phone, a smart phone, a personal digital assistant, a tabletop computer, a personal computer, a laptop computer, a mini-tablet computer, a tablet computer, or the like.

Each of these devices may include at least one processor, respectively indicated as 114, 124, 134, 144, 154, 164, 174, 184, 194, and 204. At least one memory can be provided in each device, and indicated as 115, 125, 135, 145, 155, 165, 175, 185, 195, and 205, respectively. The memory may include computer program instructions or computer code contained therein. The processors 114, 124, 134, 144, 154, 164, 174, 184, 194, and 204 and memories 115, 125, 135, 145, 155, 165, 175, 185, 195, and 205, or a subset thereof, can be configured to provide means corresponding to the various blocks and processes shown in FIGS. 9-17 and 20-26.

As shown in FIGS. 18 and 19, transceivers 116, 126, 136, 146, 156, 166, 176, 186, 196, and 206 can be provided, and each device may also include an antenna, respectively illustrated as 117, 127, 137, 147, 157, 167, 177, 187, 197, and 207. Other configurations of these devices, for example, may be provided as well.

Transceivers 116, 126, 136, 146, 156, 166, 176, 186, 196, and 206 can each, independently, be a transmitter, a receiver, or both a transmitter and a receiver, or a unit or device that is configured both for transmission and reception. For example, the transceivers 116, 126, 136, 146, 156, 166, 176, 186, 196, and 206 may be configured to modulate information onto a carrier waveform for transmission by the antennas 117, 127, 137, 147, 157, 167, 177, 187, 197, and 207, and demodulate information received via the antennas 117, 127, 137, 147, 157, 167, 177, 187, 197, and 207 for further processing by other elements of the system shown in FIGS. 18 and 19. In other embodiments, transceivers 116, 126, 136, 146, 156, 166, 176, 186, 196, and 206 may be capable of transmitting and receiving signals or data directly.

Processors 114, 124, 134, and 144 can be embodied by any computational or data processing device, such as a central processing unit (CPU), application specific integrated circuit (ASIC), or comparable device. The processors can be implemented as a single controller, or a plurality of controllers or processors. The processors may also perform functions associated with the operation of the system including, without limitation, precoding of antenna gain/phase parameters, encoding and decoding of individual bits forming a communication message, formatting of information, and overall control of the system, including process related to management of communication resources.

Memories 115, 125, 135, 145, 155, 165, 175, 185, 195, and 205 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 110, P-CSCF 120, S-CSCF 130, DF 140, PDN-GW 150, IMS-AGW 160, IBCF 170, MGCF 180, IM-MGW 190, and TrGW 200, to perform any of the processes described herein (see, for example, FIGS. 9-17 and 20-26). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIGS. 18 and 19 illustrate a system including a UE 110, P-CSCF 120, S-CSCF 130, DF 140, PDN-GW 150, IMS-AGW 160, IBCF 170, MGCF 180, IM-MGW 190, and TrGW 200, embodiments of the invention may be applicable to other configurations, and configurations involving additional elements. For example, not shown, additional UEs may be present, and additional core network elements may be present, as illustrated in FIGS. 2-17, for example.

As mentioned above, according to one embodiment, the system shown in FIGS. 18 and 19 may include a UE 110, P-CSCF 120, S-CSCF 130, DF 140, PDN-GW 150, IMS-AGW 160, IBCF 170, MGCF 180, IM-MGW 190, and TrGW 200, for example. In an embodiment, an apparatus, such as, for example, P-CSCF 120, may be controlled by memory 115 and processor 114 to identify a network node that provides call content interception. The P-CSCF 120 may also be controlled by memory 115 and processor 114 to determine a codec used at a location of the call content interception at the network node. The P-CSCF 120 may further be controlled by memory 115 and processor 114 to send a matched codec of the codec used at the location of the call content interception at the network node to a delivery function in the communications network (e.g., DF 140).

In an embodiment, the network node that provides call content interception may include a packet data network gateway or an IP multimedia system access gateway. In another embodiment, the network node that provides call content interception may also include a transit gateway or a web real time communication gateway. The P-CSCF 120 may also be controlled by memory 115 and processor 114 to determine the location of call content interception at the network node. In an embodiment, the location of call content interception at the IP multimedia system access gateway may include an ingress side and an egress side.

The P-CSCF 120 may further be controlled by memory 115 and processor 114 to send session description protocol security description keys to the delivery function if the call content interception is done at the packet data network gateway or at the ingress side of the IP multimedia system access gateway, and send no session description protocol security description keys if the call content interception is done at the egress side of the IP multimedia system access gateway. In an embodiment, the P-CSCF 120 may also be controlled by memory 115 and processor 114 to send session description protocol security description keys to the delivery function if the call content interception is done at the packet data network gateway, the ingress side of the IP multimedia system access gateway, or the egress side of the IP multimedia system access gateway.

In an embodiment, if the call content is intercepted in a decrypted form, the session description protocol security description keys may not be sent to the delivery function. In another embodiment, the intercepted call content may be encrypted either end to end or end to access edge.

According to another embodiment, an apparatus, such as, for example, DF 140, may be controlled by memory 145 and processor 144 to receive a matched codec of a codec used at a location of a call content interception at a media node from a network node in a communications network. The DF 140 may also be controlled by memory 145 and processor 144 to send the matched codec to a law enforcement agency.

The DF 140 may also be controlled by memory 145 and processor 144 to receive session description protocol security description keys from the network node. The DF 140 may further be controlled by memory 145 and processor 144 to remove media information received from a serving call state control function that are duplicates of media information received from the network node before sending the media information to the law enforcement agency. Further, the DF 140 may be controlled by memory 145 and processor 144 to send the session description protocol security description keys to a second delivery function. In an embodiment, the network node may include a proxy call state control function, an interworking border control function, or a media gateway control function. Additionally, in another embodiment, the DF 140 may be controlled by memory 145 and processor 144 to retrieve keys, including session description protocol security description keys, from the KMS. Further, in an embodiment, the intercepted call content may be encrypted either end to end or end to access edge.

FIG. 20 illustrates an apparatus 210, according to certain embodiments. In one embodiment, the apparatus 210 may be a network node, such as, for example, a P-CSCF, discussed above in connection with FIG. 18. It should be noted that one of ordinary skill in the art would understand that apparatus 210 may include components or features not shown in FIG. 20.

As illustrated in FIG. 20, apparatus 210 may include an identifying unit 214 that may be configured to identify a network node that provides call content interception. The apparatus 210 may also include a determining unit 215 that may be configured to determine a codec used at a location of the call content interception at the network node. The apparatus 210 may further include a sending unit 216 that may be configured to send a matched codec of the codec used at the location of the call content interception at the network node to a delivery function in the communications network. Additionally, the apparatus 210 may include one or more antennas 217 for transmitting and receiving signals and/or data to and from apparatus 210.

FIG. 21 illustrates an apparatus 220, according to certain embodiments. In one embodiment, the apparatus 220 may be a network node, such as, for example, a delivery function, discussed above in connection with FIG. 18. It should be noted that one of ordinary skill in the art would understand that apparatus 220 may include components or features not shown in FIG. 21.

As illustrated in FIG. 21, apparatus 220 may include a receiving unit 224 that may be configured to receive a matched codec of a codec used at a location of a call content interception at a media node from a network node in a communications network. The apparatus 220 may also include a sending unit 225 that may be configured to send the matched codec to a law enforcement agency. Additionally, the apparatus 220 may include one or more antennas 227 for transmitting and receiving signals and/or data to and from apparatus 210.

Figure 22:
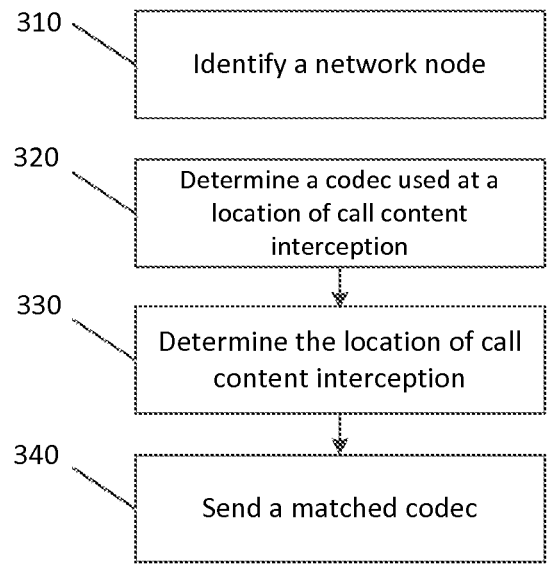
FIG. 22 illustrates a method, according to certain embodiments.

FIG. 22 illustrates an example of a flow diagram of a method, according to certain embodiments. In an embodiment, the method of FIG. 22 may be performed by a network node, such as a P-CSCF, for example. The method may include, at 310, identifying a network node that provides call content interception. The method may also include, at 320, determining a codec used at a location of the call content interception at the network node. The method may further include, at 330, determining the location of call content interception at the network node.

The method may also include, at 340, sending a matched codec of the codec used at the location of the call content interception at the network node to a delivery function in the communications network.

Figure 23:
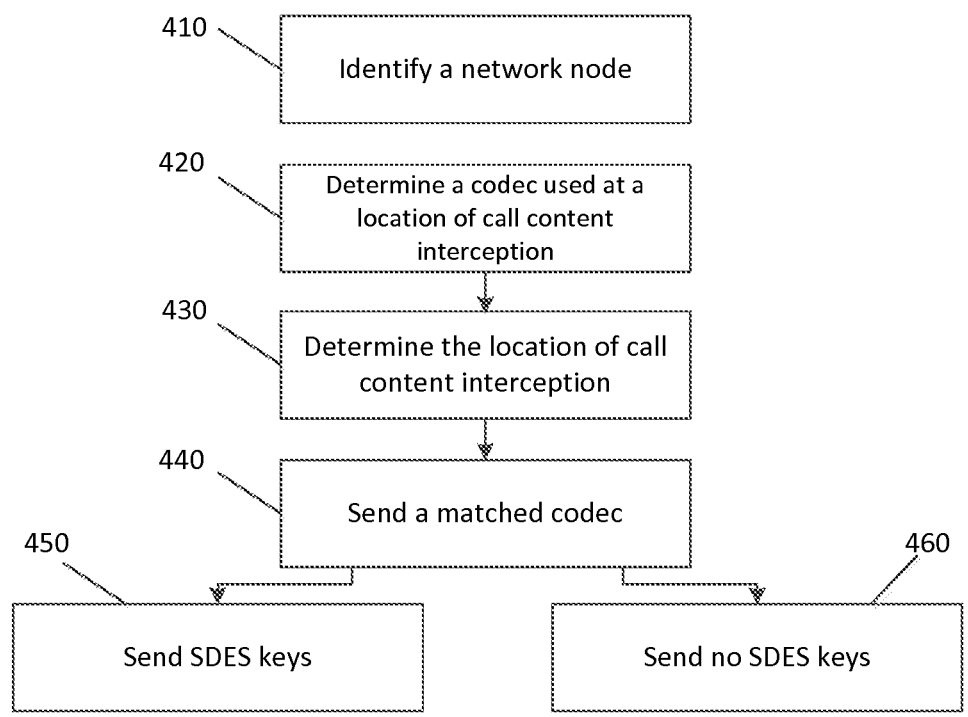
FIG. 23 illustrates another method, according to certain embodiments.

FIG. 23 illustrates an example of a flow diagram of a method, according to certain embodiments. In an embodiment, the method of FIG. 23 may be performed by a network node, such as a P-CSCF, for example. The method may include, at 410, identifying a network node that provides call content interception. The method may also include, at 420, determining a codec used at a location of the call content interception at the network node. The method may further include, at 430, determining the location of call content interception at the network node.

The method may also include, at 440, sending a matched codec of the codec used at the location of the call content interception at the network node to a delivery function in the communications network. The method may further include, at 450, sending session description protocol security description keys to the delivery function if the call content interception is done at the packet data network gateway or at the ingress side of the IP multimedia system access gateway. The method may also include, at 460, sending no session description protocol security description keys if the call content interception is done at the egress side of the IP multimedia system access gateway.

Figure 24:
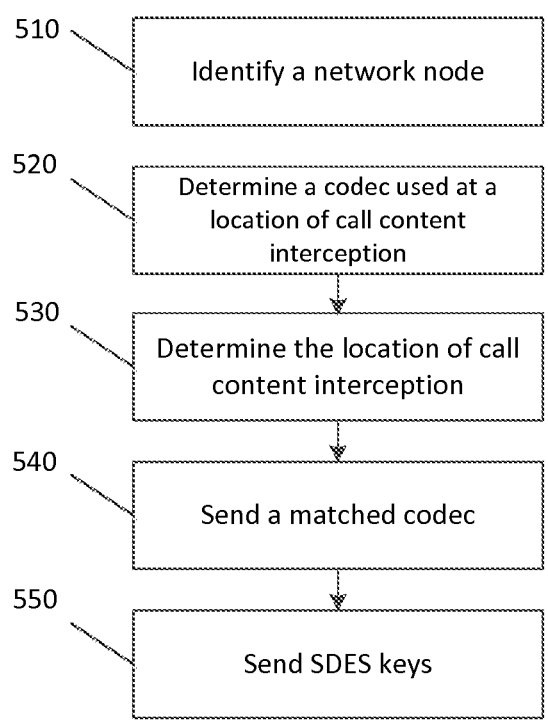
FIG. 24 illustrates another method, according to certain embodiments.

FIG. 24 illustrates an example of a flow diagram of a method, according to certain embodiments. In an embodiment, the method of FIG. 24 may be performed by a network node, such as a P-CSCF, for example. The method may include, at 510, identifying a network node that provides call content interception. The method may also include, at 520, determining a codec used at a location of the call content interception at the network node. The method may further include, at 530, determining the location of call content interception at the network node.

The method may also include, at 540, sending a matched codec of the codec used at the location of the call content interception at the network node to a delivery function in the communications network. The method may further include, at 550, sending session description protocol security description keys to the delivery function if the call content interception is done at the packet data network gateway, the ingress side of the IP multimedia system access gateway, or the egress side of the IP multimedia system access gateway.

FIG. 25 illustrates an example of a flow diagram of a method, according to certain embodiments. In an embodiment, the method of FIG. 25 may be performed by a network node, such as a delivery function, for example. The method may include, at 610, receiving a matched codec of a codec used at a location of a call content interception at a media node from a network node in a communications network. The method may also include, at 620, removing media information received from a serving call state control function that are duplicates of media information received from the network node before sending the media information to the law enforcement agency. The method may also include, at 630, sending the matched codec to a law enforcement agency.

FIG. 26 illustrates an example of a flow diagram of a method, according to certain embodiments. In an embodiment, the method of FIG. 26 may be performed by a network node, such as a delivery function, for example. The method may include, at 710, receiving a matched codec of a codec used at a location of a call content interception at a media node from a network node in a communications network. The method may also include, at 720, removing media information received from a serving call state control function that are duplicates of media information received from the network node before sending the media information to the law enforcement agency. The method may also include, at 730, sending the matched codec to a law enforcement agency.

The method may further include, at 740, receiving session description protocol security description keys from the network node. The method may also include, at 750, sending the session description protocol security description keys to a second delivery function.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

3GPP 3rd Generation Partnership Project
AGW Access Gateway
ASIC Application-Specific Integrated Circuits
BCF Border Control Function
CC Call Content (or Communication Content)
CPU Central Processing Unit
CR Change Request
CSCF Call State Control Function
CSP Communication Service Provider
DF Delivery Function
DF2 Delivery Function 2 (for IRI)
DF3 Delivery Function 3 (for CC)
DTLS Datagram Transport Layer Security
e2e end-to-end (security)
e2ae end-to-access-edge (security)
E-UTRAN Evolved UTRAN
GGSN Gateway GPRS Support Node
GPRS Generic Packet Radio Service
HDD Hard Disk Drive
IBCF Interworking BCF
ICE Intercepting Control Element
IMS-AGW IMS Access Gateway
IM-MGW IMS Media Gateway
IMS IP Multimedia Gateway
IP Internet Protocol
IRI Intercept Related Information
LEA Law Enforcement Agency
LI Lawful Interception
LTE Long Term Evolution
MGCF Media Gateway Control Function
MGW Media Gateway
MIKEY Multimedia Internet KEYing
P-GW PDN-GW
P-CSCF Proxy CSCF
PDN Packet Data Network
PDN-GW PDN-Gateway
RAM Random Access Memory
ROM Read Only Memory
S-CSCF Serving CSCF
SDES SDP Security Description
SDP Session Description Protocol
SIP Session Initiation Protocol
SRTP Secured Real Time Protocol
TrGW Transit Gateway
TSP Telecommunications Service Provider
UMTS Universal Mobile Telecommunications System
UTRAN Universal Mobile Telecommunications System Terrestrial Radio Access Network
VoIP Voice Over IP
WebRTC Web Real Time Communication

We claim:

1. A method, comprising:
 identifying a network node that provides call content interception;
 determining a codec type used at a location of the call content interception at the network node;
 sending a matched codec of the codec type used at the location of the call content interception at the network node to a delivery function in the communications network; and
 sending session description protocol security description keys to the delivery function if the call content interception is done at a packet data network gateway or at an ingress side of an IP multimedia system access gateway, and sending no session description protocol security description keys if the call content interception is done at an egress side of the IP multimedia system access gateway.

2. A computer program, embodied on a non-transitory computer readable medium, the computer program configured to control a processor to perform the method according to claim 1.

3. A method, comprising:
 identifying a network node that provides call content interception;
 determining a codec type used at a location of the call content interception at the network node; and
 sending a matched codec of the codec type used at the location of the call content interception at the network node to a delivery function in the communications network,
 wherein, if the call content is intercepted in a decrypted form, session description protocol security description keys are not sent to the delivery function.

4. A computer program, embodied on a non-transitory computer readable medium, the computer program configured to control a processor to perform the method according to claim 3.

5. An apparatus, comprising:

at least one processor; and at least one memory including computer program code, wherein the at least one memory and the computer program code are configured, with the at least one processor, to cause the apparatus at least to identify a network node that provides call content interception, determine a codec type used at a location of the call content interception at the network node;

send a matched codec of the codec type used at the location of the call content interception at the network node to a delivery function in the communications network; and send session description protocol security description keys to the delivery function if the call content interception is done at a packet data network gateway or at an ingress side of an IP multimedia system access gateway, and to send no session description protocol security description keys if the call content interception is done at an egress side of the IP multimedia system access gateway.

6. An apparatus, comprising:

at least one processor; and at least one memory including computer program code, wherein the at least one memory and the computer program code are configured, with the at least one processor, to cause the apparatus at least to identify a network node that provides call content interception, determine a codec type used at a location of the call content interception at the network node; and send a matched codec of the codec type used at the location of the call content interception at the network node to a delivery function in the communications network, wherein, if the call content is intercepted in a decrypted form, session description protocol security description keys are not sent to the delivery function.

* * * * *